US012142856B2

(12) United States Patent
Han et al.

(10) Patent No.: US 12,142,856 B2
(45) Date of Patent: Nov. 12, 2024

(54) MULTILAYER DIELECTRIC RESONATOR ANTENNA AND ANTENNA MODULE

(71) Applicant: SAMSUNG ELECTRO-MECHANICS CO., LTD., Suwon-si (KR)

(72) Inventors: Myeong Woo Han, Suwon-si (KR); Youngsik Hur, Suwon-si (KR); Jeongki Ryoo, Suwon-si (KR); Hyungjin Lee, Suwon-si (KR); Woncheol Lee, Suwon-si (KR); Wongi Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 11 days.

(21) Appl. No.: 17/176,421

(22) Filed: Feb. 16, 2021

(65) Prior Publication Data

US 2022/0013915 A1 Jan. 13, 2022

(30) Foreign Application Priority Data

Jul. 8, 2020 (KR) ........................ 10-2020-0084184
Sep. 16, 2020 (KR) ........................ 10-2020-0119293

(51) Int. Cl.
*H01Q 9/04* (2006.01)
*H01Q 1/24* (2006.01)
*H01P 7/10* (2006.01)

(52) U.S. Cl.
CPC ........... *H01Q 9/0485* (2013.01); *H01Q 1/243* (2013.01); *H01P 7/10* (2013.01)

(58) Field of Classification Search
CPC ..... H01Q 9/0485; H01Q 1/243; H01Q 9/0414
See application file for complete search history.

(56) References Cited

U.S. PATENT DOCUMENTS 4,835,538 A * 5/1989 McKenna ............ H01Q 9/0414 343/700 MS
5,453,754 A * 9/1995 Fray ........................ H01Q 19/09 343/873
5,940,036 A * 8/1999 Oliver .................. H01Q 9/0485 333/219.1
(Continued)

FOREIGN PATENT DOCUMENTS

CN 105390809 A * 3/2016 ............... H01Q 1/36
CN 110635228 A * 12/2019 ............... H01Q 1/36
(Continued)

OTHER PUBLICATIONS

Shukla et al. "Compact Cylindrical Dielectric Resonator Antenna for MSS Handheld Terminals", 2019 URSI Asia-Pacific Radio Science Conference (AP-RASC) (Year: 2019).*
(Continued)

*Primary Examiner* — AB Salam Alkassim, Jr.
(74) *Attorney, Agent, or Firm* — NSIP Law

(57) ABSTRACT

A dielectric resonator antenna includes: a first dielectric block; at least one second dielectric block stacked on the first dielectric block in a first direction; and a feed unit disposed in the first dielectric block. A side surface of the first dielectric block facing a second direction crossing the first direction is exposed to an outside of the dielectric resonator antenna.

19 Claims, 40 Drawing Sheets

(56) References Cited

U.S. PATENT DOCUMENTS 5,952,972 A * 9/1999 Ittipiboon ............ H01Q 9/0485 343/873
6,147,647 A * 11/2000 Tassoudji ............ H01Q 9/0492 333/219.1
6,292,141 B1 9/2001 Lim
6,323,808 B1* 11/2001 Heinrichs ............ H01Q 9/0485 343/702
6,323,824 B1* 11/2001 Heinrichs ............ H01Q 1/242 343/873
6,344,833 B1* 2/2002 Lin ............ H01Q 21/28 343/873
6,373,441 B1* 4/2002 Porath ............ H01Q 1/242 343/873
6,452,554 B1* 9/2002 Aoyama ............ H01Q 1/38 343/702
6,452,565 B1* 9/2002 Kingsley ............ H01Q 19/06 343/873
6,700,539 B2* 3/2004 Lim ............ H01Q 9/0407 343/700 MS
7,310,031 B2* 12/2007 Pance ............ H01P 1/207 333/219.1
8,009,107 B2* 8/2011 Li ............ H01Q 21/30 343/700 MS
8,749,434 B2 6/2014 Han et al.
9,231,311 B2* 1/2016 Tiezzi ............ H01Q 3/26
10,374,315 B2 8/2019 Pance et al.
10,587,039 B2 3/2020 Pance et al.
10,910,721 B2* 2/2021 Pan ............ H01Q 9/0485
11,283,189 B2* 3/2022 Pance ............ H01Q 21/0093
11,735,825 B1* 8/2023 Leung ............ H01Q 19/08 343/702
2001/0048392 A1* 12/2001 Kawahata ............ H01Q 1/243 343/700 MS
2002/0196190 A1* 12/2002 Lim ............ H01Q 5/40 343/846
2004/0051602 A1* 3/2004 Pance ............ H01P 1/2084 333/219.1
2004/0113843 A1* 6/2004 Le Bolzer ............ H01Q 9/0485 343/700 MS
2004/0130489 A1* 7/2004 Le Bolzer ............ H01Q 9/0485 343/700 MS
2004/0233107 A1* 11/2004 Popov ............ H01Q 9/0492 343/700 MS
2004/0246180 A1* 12/2004 Okado ............ H01Q 9/42 343/702
2004/0263422 A1* 12/2004 Lynch ............ H01Q 23/00 343/700 MS
2005/0017903 A1* 1/2005 Ittipiboon ............ H01Q 5/40 343/700 MS
2005/0057402 A1* 3/2005 Ohno ............ H01Q 21/0075 343/700 MS
2005/0225481 A1* 10/2005 Bonthron ............ H01Q 21/0093 342/175
2006/0232474 A1* 10/2006 Fox ............ H01Q 5/357 343/700 MS
2007/0164420 A1* 7/2007 Chen ............ H01Q 1/2283 257/691
2008/0042903 A1* 2/2008 Cheng ............ H01Q 9/065 343/700 MS
2008/0122703 A1* 5/2008 Ying ............ H01Q 9/0492 343/702
2009/0015488 A1* 1/2009 Jow ............ H01Q 9/0407 343/700 MS
2009/0102739 A1* 4/2009 Chang ............ H01Q 1/2291 343/846
2010/0156754 A1* 6/2010 Kondou ............ H01Q 9/0485 343/911 R
2011/0122036 A1* 5/2011 Leung ............ H01Q 9/0485 343/785
2011/0133991 A1* 6/2011 Lee ............ H01Q 9/0485 343/700 MS
2011/0248891 A1* 10/2011 Han ............ H01Q 1/40 343/700 MS
2014/0327597 A1* 11/2014 Rashidian ............ H01Q 9/0485 343/905
2015/0194730 A1* 7/2015 Sudo ............ H01Q 5/378 343/905
2016/0190696 A1* 6/2016 Preradovic ............ H01Q 1/38 343/700 MS
2016/0322708 A1* 11/2016 Tayfeh Aligodarz ............ H01Q 21/0087
2016/0322714 A1 11/2016 Ying et al.
2017/0040700 A1* 2/2017 Leung ............ H01Q 9/0485
2017/0125908 A1* 5/2017 Pance ............ H01Q 9/0457
2017/0125909 A1* 5/2017 Pance ............ H01Q 9/0485
2017/0125910 A1* 5/2017 Pance ............ H01Q 9/0485
2017/0187108 A1* 6/2017 Wang ............ H01Q 3/267
2018/0054006 A1* 2/2018 Wang ............ H01Q 21/24
2018/0115072 A1* 4/2018 Pance ............ H01Q 21/061
2018/0152141 A1* 5/2018 Koyama ............ H01Q 9/0442
2018/0309202 A1 10/2018 Pance et al.
2019/0013584 A1* 1/2019 Ryu ............ H01Q 21/0006
2019/0190120 A1* 6/2019 Kim ............ H01Q 1/2283
2019/0221939 A1* 7/2019 George ............ H01Q 19/18
2019/0393607 A1* 12/2019 Pance ............ H01Q 9/0485
2020/0028231 A1* 1/2020 Leung ............ H01Q 1/38
2020/0083602 A1* 3/2020 Sethumadhavan .. H01Q 21/205
2020/0083610 A1* 3/2020 Pance ............ H01Q 15/08
2020/0099136 A1* 3/2020 Pance ............ H01Q 5/50
2020/0106179 A1* 4/2020 Izawa ............ H01Q 9/0414
2020/0122387 A1* 4/2020 Polidore ............ B33Y 30/00
2020/0212581 A1* 7/2020 Zhu ............ H01Q 9/0485
2020/0280131 A1* 9/2020 Avser ............ H01Q 21/061
2020/0280133 A1* 9/2020 Avser ............ H01Q 5/42
2021/0384648 A1* 12/2021 Leung ............ H01Q 9/0485
2022/0158359 A1* 5/2022 Lee ............ H01Q 21/08
2022/0181052 A1* 6/2022 Williams ............ H01F 1/0315
2022/0336957 A1* 10/2022 Lee ............ H01Q 21/08
2022/0359989 A1* 11/2022 Wang ............ H01Q 21/08
2023/0111583 A1* 4/2023 Kim ............ H01Q 9/0485 343/702
2023/0121641 A1* 4/2023 Lee ............ H01Q 21/08 343/700 MS
2024/0106128 A1* 3/2024 Ramalingam ............ H01Q 5/385

FOREIGN PATENT DOCUMENTS

CN 111883914 A * 11/2020 ............ H01Q 1/36
CN 214254724 U * 9/2021 ............ H01Q 1/50
CN 215896692 U * 2/2022 ............ H01Q 1/36
JP 2005-130532 A 5/2005
JP 2005-341320 A 12/2005
JP 2018-515035 A 6/2018
JP 2018-532345 A 11/2018
JP 2020-10314 A 1/2020
KR 10-1119267 B1 3/2012

OTHER PUBLICATIONS

K. M. Luk and K. W. Leung, “Dielectric Resonator Antennas”, Research Studies Press, Hertfor dshire, UK, 2003 (404 Pages in English).
R. D. Richtmyer, “Dielectric Resonators,” Journal of Applied Physics, vol. 10, Jun. 1939, pp. 391-398 (9 Pages in English).
Korean Office Action issued on Jun. 25, 2024, in counterpart Korean Patent Application No. 10-2020-0119293 (8 pages in English, 8 pages in Korean).
Japanese Office Action issued on Sep. 3, 2024, in counterpart Japanese Patent Application No. 2021-032118 (6 pages in English, 4 pages in Japanese).

* cited by examiner

MULTILAYER DIELECTRIC RESONATOR ANTENNA AND ANTENNA MODULE

CROSS-REFERENCE TO RELATED APPLICATIONS

This application claims the benefit under 35 USC 119(a) of Korean Patent Application Nos. 10-2020-0084184 and 10-2020-0119293 filed on Jul. 8, 2020, and Sep. 16, 2020, respectively, in the Korean Intellectual Property Office, the entire disclosures of which are incorporated herein by reference for all purposes.

BACKGROUND

1. Field

The following description relates to a dielectric resonator antenna and an antenna module including a dielectric resonator antenna.

2. Description of Related Art

The development of wireless communication systems has greatly changed lifestyles over the past 20 years. Advanced mobile systems with gigabit data rates per second are required to support potential wireless applications such as multimedia devices, Internet of Things (IoT), and intelligent transportation systems. The data rate requirements of advanced mobile systems are currently impossible to realize due to a limited bandwidth in a 4G communication system. To overcome the problem of bandwidth limitations, the International Telecommunication Union has licensed a millimeter wave (mmWave) spectrum for a potential fifth generation (5G) application range.

Recently, a mmWave 5G antenna module for mobile has been required to be downsized. Due to radiation characteristics, a 5G antenna may be disposed at an outermost side of a mobile phone. Thus, as a mobile phone structure becomes thinner when a large screen is implemented in the mobile phone, a length of one side of the antenna module gradually decreases. As the size of the antenna module decreases, performance such as antenna gain and bandwidth may decrease.

In addition, it is advantageous to use a board with a high dielectric constant in order to design a small mmWave 5G antenna, but there is a problem that conductor loss of a metal patch increases, resulting in a decrease in antenna radiation efficiency and a narrow bandwidth in a conventional patch antenna using a high dielectric constant board.

Therefore, it is desirable to provide a structure that minimizes performance degradation in a mmWave 5G antenna module.

The above information disclosed in this Background section is only for enhancement of understanding of the background of the invention, and therefore it may contain information that does not form the prior art that is already known in this country to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a dielectric resonator antenna includes: a first dielectric block; at least one second dielectric block stacked on the first dielectric block in a first direction; and a feed unit disposed in the first dielectric block. A side surface of the first dielectric block facing a second direction crossing the first direction is exposed to an outside of the dielectric resonator antenna.

The first dielectric block and the second dielectric block may be bonded with a polymer layer interposed between the first dielectric block and the second dielectric block.

The first dielectric block and a second dielectric block adjacent to the first dielectric block, among the at least one second dielectric block may be aligned with each other such that at least one pair of side surfaces of the first dielectric block and the second dielectric block are positioned on a same plane.

The at least one second dielectric block may have a same stacking plane shape to overlap the first dielectric block on a stacking plane.

The first dielectric block and the at least one second dielectric block may have different dielectric constants.

The feed unit may include a feed via extending in the first direction within the first dielectric block.

The feed via may include a first feed via and a second feed via spaced apart from each other in the first dielectric block.

The feed unit may include a feed strip extending in the first direction on an outer surface of the first dielectric block.

The dielectric resonator antenna may further include a metal via extending in the first direction in a second dielectric block, among the at least one second dielectric block.

The metal via may include a plurality of metal vias disposed inside the second dielectric block. The plurality of metal vias may be arranged along a circumference of the second dielectric block to form a via wall.

The dielectric resonator antenna may further include a metal wall formed along a circumference of a second dielectric block, among the at least one second dielectric block, to cover an outer side surface of the second dielectric block.

The dielectric resonator antenna may further include a metal patch connected to the feed unit and disposed on an upper surface of the first dielectric block.

The at least one second dielectric block may be stacked on the first dielectric block in only the first direction, and the first direction may be one direction among two directions of an axis.

In another general aspect, a dielectric resonator antenna module includes a board; a first dielectric block disposed on the board; at least one second dielectric block stacked on the first dielectric block in a first direction; and a feed unit disposed in the first dielectric block. A side surface of the first dielectric block facing a second direction crossing the first direction may be exposed to an outside of the dielectric resonator antenna module.

The board may include a stacking plane, and the first direction may be a direction that is perpendicular to the stacking plane.

A polymer may be disposed between the first dielectric block and the at least one second dielectric block.

The feed unit may include a feed via connected to a feed wire positioned on the board and extending in the first direction within the first dielectric block.

The at least one second dielectric block may be stacked on the first dielectric block in only the first direction, and the first direction is one direction among two directions of an axis.

In another general aspect, a dielectric resonator antenna includes: a first dielectric block; a second dielectric block vertically stacked on the first dielectric block; and a feed unit including either one of feed vias extending vertically inside the first dielectric block and feed strips extending vertically on a side surface of the first dielectric block. The side surface of the first dielectric block extends vertically and is exposed to an outside of the dielectric resonator antenna.

The dielectric resonator antenna may further include metal vias disposed in the second dielectric block, and extending vertically.

The feed unit may include the feed vias, and the feed vias may be formed by portions of the metal vias.

The dielectric resonator antenna may further include a polymer layer disposed between the first dielectric block and the second dielectric block.

The dielectric resonator antenna may further include a third dielectric block vertically stacked on the first dielectric block, and disposed between the first dielectric block and the second dielectric block.

The dielectric resonator antenna may further include metal vias disposed in the second dielectric block, and extending vertically. The third dielectric block may not include any metal vias.

The dielectric resonator antenna may further include metal vias disposed in the third dielectric block, and extending vertically. The second dielectric block may not include any metal vias.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
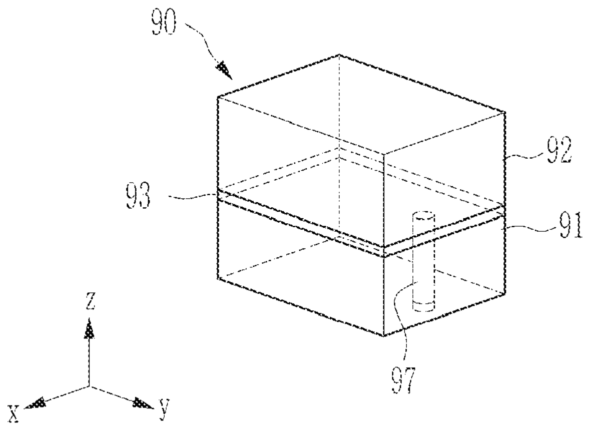
FIG. 1 is a perspective view showing a dielectric resonator antenna, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

FIG. 1 is a perspective view showing a dielectric resonator antenna 90, according to an embodiment.

Referring to FIG. 1, the dielectric resonator antenna (DRA) 90 may be formed by stacking a second dielectric block 92 on a first dielectric block 91. A feed via 97, which is a feed unit, is formed in the first dielectric block 91 so as to extend in a first direction (z-axis direction in FIG. 1) that is perpendicular to the stacking plane (x-y plane in FIG. 1), and the feed via 97 may be configured to extend within the first dielectric block 91 by a predetermined length or to pass through the first dielectric block 91. The feed via 97 may be formed as a single via, for example.

The first dielectric block 91 may have, for example, a rectangular parallelepiped shape, and may have a via hole into which the feed via 97 may be inserted. The via hole may extend within the first dielectric block 91 by the predetermined length in the direction perpendicular to the stacking plane, and may be formed to penetrate the first dielectric block 91 from a lower surface to an upper surface of the first dielectric block 91.

The second dielectric block 92 may have, for example, a rectangular parallelepiped shape similar to the shape of the first dielectric block 91, and may be stacked on the first dielectric block 91 or may be bonded to the first dielectric block 91 through a polymer layer 93. Herein, the second dielectric block 92 may have a planar shape that is the same as that of the first dielectric block 91 to overlap the first dielectric block 91 on a plane. Therefore, when the second dielectric block 92 is stacked on the first dielectric block 91 to be bonded thereto, each of the side surfaces of the second dielectric block 92 may be smoothly connected to corresponding side surfaces of the first dielectric block 91 without a step so as to be positioned on the same plane with the corresponding side surfaces of the first dielectric block 91.

The polymer layer 93 may be disposed between the first dielectric block 91 and the second dielectric block 92 to bond the first and second dielectric blocks 91 and 92 together.

The first dielectric block 91 and the second dielectric block 92 may be stacked in a single direction of the first direction (z-axis direction in FIG. 1). That is, when the first dielectric block 91 is mounted in a board, bonded surfaces of the first dielectric block 91 and the second dielectric block 92 may be positioned in a direction that is perpendicular to the board.

When stacked in this way, the first dielectric block 91 may include an upper surface facing the second dielectric block 92 and a side surface facing a second direction crossing the first direction, and the side surface may be exposed to the outside. Herein, the side surface of the first dielectric block 91 may be a surface that does not face the second dielectric block 92 and shares an edge with the upper surface.

When the DRA 90 is in the air, the side surface of the first dielectric block 91 may be disposed to contact the air. In addition, since the second dielectric block 92 is stacked on the first dielectric block 91 in a single direction, a side surface of the second dielectric block 92 may also be exposed to the outside, and the second dielectric block 92 may be disposed such that the side surface of the second dielectric block 92 is in contact with air when in the air.

The first dielectric block 91 and the second dielectric block 92 may be made of a ceramic material. The polymer layer 93 may any one or any combination of any two or more of PI, PMMA, PTFE, PPE, BCB, and LCP-based polymers. In addition, the second dielectric block 92 and the first dielectric block 91 may have same or different dielectric constants, and, for example, the second dielectric block 92 may have a lower dielectric constant than that of the first dielectric block 91. In addition, the polymer layer 93 may have a lower dielectric constant than that of the first dielectric block 91 or the second dielectric block 92.

Figure 2:
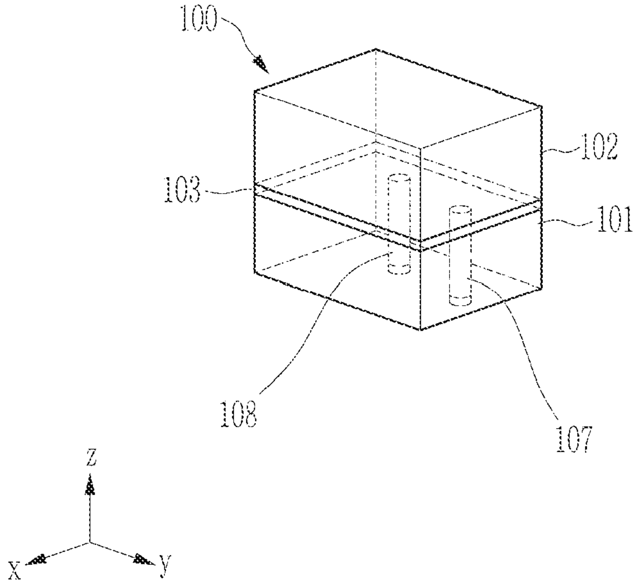
FIG. 2 is a perspective view showing a dielectric resonator antenna, according to another embodiment.

FIG. 2 is a perspective view showing a DRA 100, according to another embodiment.

The DRA 100 may be configured by stacking a second dielectric block 102 on a first dielectric block 101. Feed vias 107 and 108, which are constitute a feed unit, are formed in the first dielectric block 101 so as to extend in a first direction (z-axis direction in FIG. 2) that is perpendicular to the stacking plane (x-y plane in the drawing), and the feed vias 107 and 108 may be configured to extend within the first dielectric block 101 by a predetermined length or to pass through the first dielectric block 101.

The first dielectric block 101 may have, for example, a rectangular parallelepiped shape, and may have via holes into which the feed vias 107 and 108 may be respectively inserted. The via holes may extend within the first dielectric block 101 by the predetermined length in a direction perpendicular to the stacking plane, and may be formed to penetrate from a lower surface to an upper surface of the first dielectric block 101.

The second dielectric block 102 may be formed with, e.g., a rectangular parallelepiped shape like the first dielectric block 101, and may be stacked on the first dielectric block 101 or may be bonded to the first dielectric block 101 through a polymer layer 103. The second dielectric block 102 may have a planar shape that is the same as that of the first dielectric block 101 to overlap the first dielectric block 101 on a plane. Therefore, when the second dielectric block 102 is stacked on the first dielectric block 101 to be bonded thereto, each of the side surfaces of the second dielectric block 102 may be smoothly connected to corresponding side surfaces of the first dielectric block 101 without a step so as to be positioned on the same plane with the corresponding side surfaces of the first dielectric block 101.

The polymer layer 103 may be disposed between the first dielectric block 101 and the second dielectric block 102 to bond the first and second dielectric blocks 101 and 102 together.

The first dielectric block 101 and the second dielectric block 102 may be stacked in a single direction of the first direction (z-axis direction in FIG. 2). The first dielectric block 101 includes an upper surface facing the second dielectric block 102 and a side surface facing the second direction crossing the first direction. Herein, the side surface of the first dielectric block 101 may be a surface that does not face the second dielectric block 102 and shares an edge with the upper surface. When stacked in this way, the side surface of the first dielectric block 101 may be exposed to the outside.

Accordingly, when the DRA 100 is in the air, the side surface of the first dielectric block 101 may be disposed to contact the air. In addition, since the second dielectric block 102 is stacked on the first dielectric block 101 in a single direction, a side surface of the second dielectric block 102 may also be exposed to the outside, and the second dielectric block 102 may be disposed such that the side surface of the second dielectric block 102 is in contact with air when in the air.

The DRA 100 having a structure in which the first dielectric block 101 and the second dielectric block 102 are stacked in a single direction may have a structure extending in one direction. Therefore, it is easy to dispose the DRA 100 adjacent to and along an edge of an electronic device.

In addition, when the first dielectric block 101 and the second dielectric block 102 are stacked in a single direction, a manufacturing advantage may be provided. That is, a plurality of via holes are formed in a dielectric board for manufacturing the first dielectric block 101 to form the feed vias 107 and 108, and another dielectric board for manufacturing the second dielectric block 102 may be stacked on the first dielectric block 101 to prepare a multilayer dielectric board. A plurality of DRAs 100 may be manufactured at once by cutting the multilayer dielectric board for each antenna unit. In this case, each of the DRAs 100 has a structure in which the first dielectric block 101 and the second dielectric block 102 are stacked in a single direction.

The feed vias 107 and 108 may be formed by changing their position on the plane of the first dielectric block 101 depending on design conditions, thereby providing design freedom.

Figure 3:
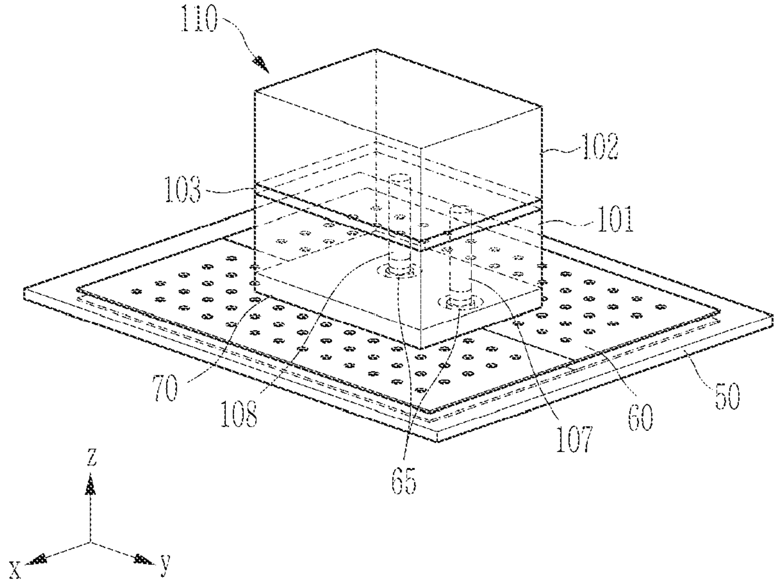
FIG. 3 is a perspective view showing a dielectric resonator antenna module in which the dielectric resonator antenna illustrated in FIG. 2 is mounted in a board, according to an embodiment.

FIG. 3 is a perspective view showing a dielectric resonator antenna (DRA) module 110, according to another embodiment.

The DRA module 110 may be configured by stacking the second dielectric block 102 and the first dielectric block 101 on a board 50. The feed vias 107 and 108 may be formed in the first dielectric block 101 so as to extend in a direction that is perpendicular to an upper surface of the board 50, and may pass through the first dielectric block 101 and be electrically connected to a feed wire 65 on the board 50.

The board 50 may be formed by patterning a ground electrode 60 and the feed wire 65 on a printed circuit board (PCB) to insulate the ground electrode 60 and the feed wire 65 from each other. That is, the feed wire 65, which is configured to supply a feed signal of the antenna, is positioned on the board 50, and the ground electrode 60 may be extended from a periphery of the feed wire 65 to a vicinity of an edge of the board 50.

For example, the first dielectric block 101 may be formed with a rectangular parallelepiped shape, and may have via holes into which the feed vias 107 and 108 may be inserted. Herein, the via holes may extend in a direction that is perpendicular to an upper surface of the board 50 when the first dielectric block 101 is mounted on the board 50, and may be formed to penetrate the first dielectric block 101 from the lower surface to the upper surface of the first dielectric block 101.

For example, the second dielectric block 102 may be formed with a rectangular parallelepiped shape similar to the shape of the first dielectric block 101, and may be stacked on the first dielectric block 101 or may be bonded to the first dielectric block 101 through a polymer layer 103. Herein, the second dielectric block 102 may have a planar shape that is the same as that of the first dielectric block 101 to overlap the first dielectric block 101 on a plane. Therefore, when the second dielectric block 102 is stacked on the first dielectric block 101 to be bonded thereto, each of the side surfaces of the second dielectric block 102 may be smoothly connected to corresponding side surfaces of the first dielectric block 101 without a step so as to be positioned on a same plane with the corresponding side surfaces of the first dielectric block 101.

The polymer layer 103 may be disposed between the first dielectric block 101 and the second dielectric block 102 to bond the two dielectric blocks together.

The first dielectric block 101 and the second dielectric block 102 may be stacked in a single direction of the first direction (z-axis direction in FIG. 3). That is, when the first dielectric block 101 is mounted on the board 50, bonded surfaces of the first dielectric block 101 and the second dielectric block 102 may be positioned in a direction that is perpendicular to the upper surface of the board 50.

When stacked in this way, the first dielectric block 101 may include an upper surface facing the second dielectric block 102 and a side surface facing a second direction crossing the first direction, and the side surface may be exposed to the outside. Herein, the side surface of the first dielectric block 101 may be a surface that does not face the second dielectric block 102 and shares an edge with the upper surface.

When the DRA module 110 is in the air, the side surface of the first dielectric block 101 may be disposed to contact the air. In addition, since the second dielectric block 102 is stacked on the first dielectric block 101 in a single direction, a side surface of the second dielectric block 102 may also be exposed to the outside, and the second dielectric block 102 may be disposed such that the side surface of the second dielectric block 102 is in contact with air when in the air.

Figure 4:
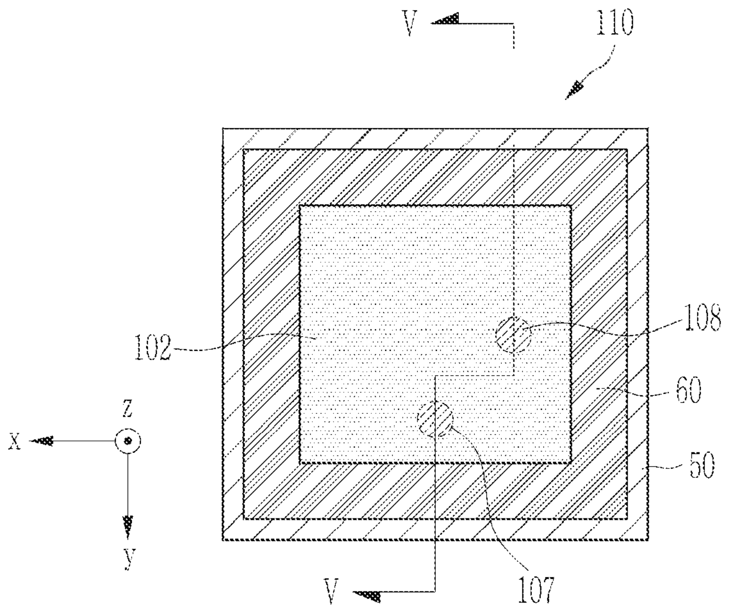
FIG. 4 is a top plan view showing the dielectric resonator antenna module illustrated in FIG. 3.
Figure 5:
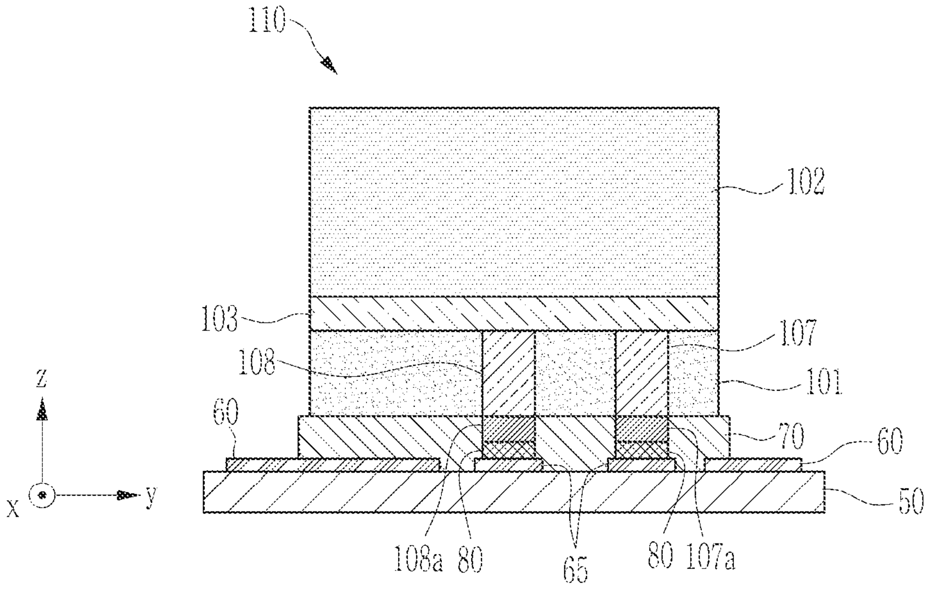
FIG. 5 is a cross-sectional view taken along a line V-V of FIG. 4.

FIG. 4 is a top plan view showing the DRA module 110, and FIG. 5 is a cross-sectional view showing the DRA 110 module taken along a line V-V of FIG. 4.

Referring to FIG. 4 and FIG. 5, the feed unit may include the first feed via 107 and the second feed via 108. The first feed via 107 and the second feed via 108 may be spaced apart from each other in the first dielectric block 101 to extend parallel to each other. That is, the feed unit may be formed to have a V-H polarization structure. For example, the first feed via 107 may transfer a first RF signal having a first polarization, and the second feed via 108 may transfer a second RF signal having a second polarization. The first RF signal may be a signal that forms an electric field and a magnetic field in x and y directions perpendicular to each other and perpendicular to a propagation direction (e.g., the z direction), and the second RF signal may be a signal that forms a magnetic field and an electric field in the x and y directions, respectively.

The first dielectric block 101 may include via holes having a cylindrical shape in order to form the first and second feed vias. The via holes may extend in a direction that is perpendicular to the upper surface of the board 50 when the first dielectric block 101 is mounted on the board 50, and may be formed to penetrate the first dielectric block 101 from the lower surface to the upper surface of the first dielectric block 101. The first and second feed vias 107 and 108 are formed by filling the corresponding via holes with a metal material, and thus they may each be formed to have a cylindrical shape, and may extend inward from the lower surface to the upper surface of the first dielectric block 101.

The first and second feed vias 107 and 108 may be exposed from the lower surface of the first dielectric block 101, and connection pads **107*a* and 108*a* may be formed at an exposed end portion of each of the first and second feed vias 107 and 108. The connection pads 107*a* and 108*a* may be connected to the feed wire 65 of the board 50 through a solder ball 80, so that the first and second feed vias 107 and 108 may be electrically connected to the board 50**.

When the first dielectric block 101 is mounted on the board 50, after connecting the connection pads **107*a* and 108*a* of the first and second feed vias 107 and 108 to the feed wire 65, a hole between the first dielectric block 101 and the board 50 may be filled with an underfill material 70 to be cured. The cured underfill material 70 may be formed to surround a portion in which the connection pads 107*a* and 108*a* are connected to the feed wire 65 of the board 50 through the solder ball 80, thereby supporting the first dielectric block 101 to be firmly fixed on the board 50. In addition, the underfill material 70 may fill a space between the first dielectric block 101 and the board 50** to prevent dust or moisture from permeating from the outside, thereby preventing insulation at the connection portion from being damaged or malfunctioning.

A large reflected wave is generated at an interface between a high dielectric constant board and air in a stacked board environment. The DRA module 110 has a structure that resonates using large reflection of the interface itself. The reflection of the interface between the dielectric block of the DRA and the air is caused by the difference in dielectric constants of two materials of the dielectric block and the air, and an antenna structure capable of impedance transformation using different dielectric constant materials is required in order to eliminate the reflection of the dielectric interface.

Figure 6:
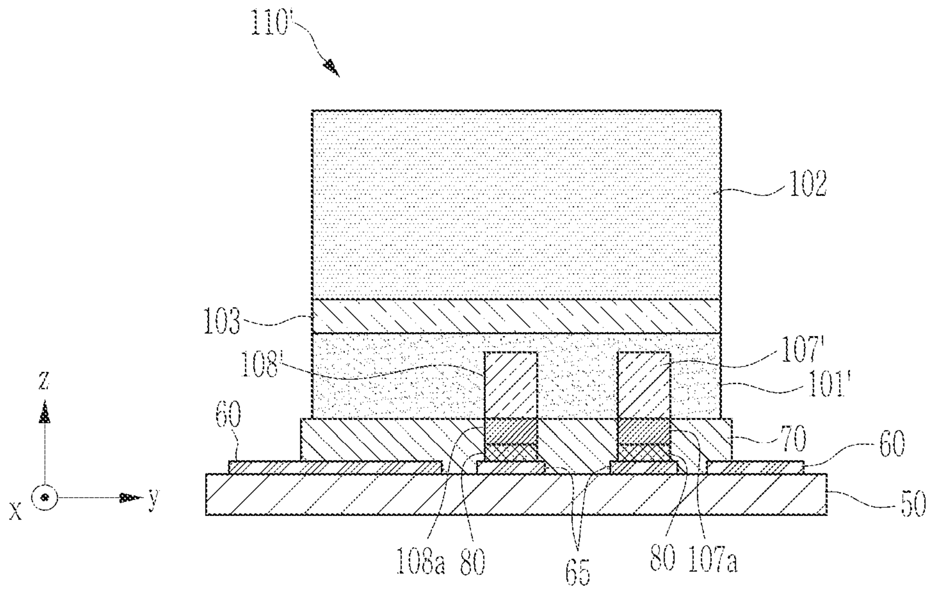
FIG. 6 is a cross-sectional view of a dielectric resonator antenna module, according to another embodiment, that is a variation of the dielectric resonator antenna module illustrated in FIG. 3.

FIG. 6 is a cross-sectional view of an exemplary variation of the dielectric resonator antenna module illustrated in FIG. 3.

Referring to FIG. 6, a DRA module 110' according to the present exemplary variation may include a first feed via 107' and a second feed via 108' as a feed unit. The first feed via 107' and the second feed via 108' may be spaced apart from each other in a first dielectric block 101' to extend parallel to each other.

The first dielectric block 101' may include via holes in order to form the first and second feed vias 107' and 108'. The via holes may extend in a direction that is perpendicular to an upper surface of the board 50 when the first dielectric block 101' is mounted on the board 50, and may be formed to extend by a predetermined length from the lower surface of the first dielectric block 101' upwardly. Therefore, the first and second feed vias 107' and 108' may be formed by filling the respective via holes with a metal material, thereby extending by the predetermined length from the lower surface of the first dielectric block 101' upwardly. In this case, the first and second feed vias 107' and 108' may be formed to have a length that is predetermined to meet desired impedance when an antenna is designed, and the length of the first and second feed vias 107' and 108' may be less than a vertical height of the first dielectric block 101'.

A process of designing the DRA module 110 illustrated in FIG. 3 to FIG. 5 will be described as follows.

First, 50 ohm impedance matching and a first resonance may be formed by using a size of the first dielectric block 101 (length of each side in the x, y, and z axis directions) and inductance components of the feed vias 107 and 108. Next, since it is necessary to design the antenna in consideration of both the first dielectric block 101 and air contact surfaces, the impedance matching may be further performed by performing impedance transformation using the polymer layer 103 and the second dielectric block 102 having a dielectric constant different from the dielectric constant of the first dielectric block 101. In addition, a second resonance may be generated by using a size of the second dielectric block 102 (length of each side in the x, y, and z axis directions) to obtain a wide bandwidth.

In the dielectric resonator antenna module 110, the first dielectric block 101 and the second dielectric block 102 may be made of a ceramic material. The polymer layer 103 may include any one or any combination of any two or more of PI, PMMA, PTFE, PPE, BCB, and LCP-based polymers. Further, the second dielectric block 102 may have a dielectric constant that is the same as the dielectric constant of the first dielectric block 101. In addition, the polymer layer 103 may have a dielectric constant lower than the dielectric constant of the first dielectric block 101 or the second dielectric block 102. However, the disclosure herein is not limited to the aforementioned examples, and, according to other embodiments, the second dielectric block 101 and the first dielectric block 102 may have different dielectric constants, and for example, the second dielectric block may have a dielectric constant lower than the dielectric constant of the first dielectric block.

Figure 7:
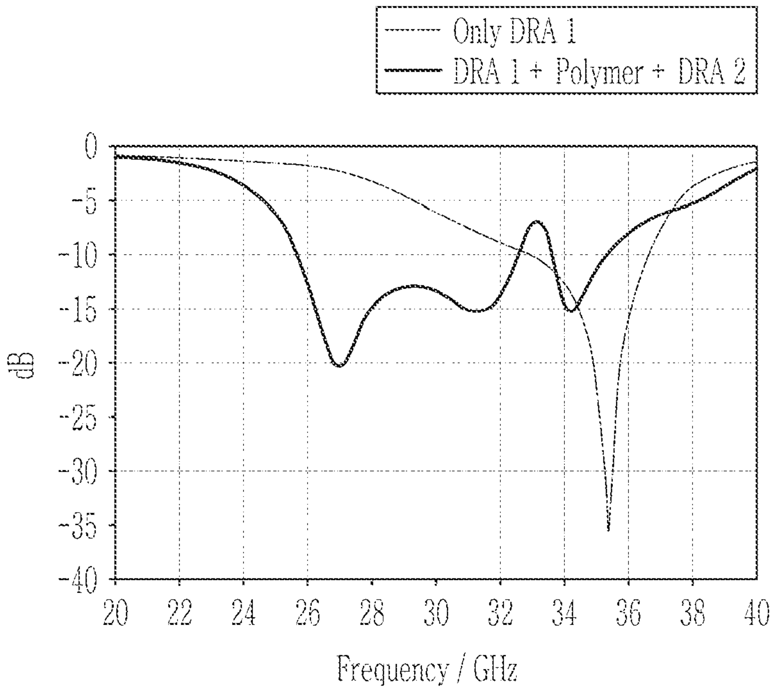
FIG. 7 illustrates a graph showing a small signal reflection characteristic as a result of simulation of the dielectric resonator antenna module illustrated in FIG. 3.

FIG. 7 is a graph showing a small signal reflection characteristic as a result of simulation of the DRA module 110 illustrated in FIG. 3.

FIG. 7 shows a comparison of a small signal reflection characteristic (solid line) of the DRA module 110 illustrated in FIG. 3 and a small signal reflection characteristic (dotted line) of a single-layered DRA module in which only the first dielectric block 101 of the embodiment of FIG. 3 is included.

In the case of the single-layer DRA, a single resonance occurs around 35 GHz, but in the case of the DRA module 110 illustrated in FIG. 3, it can be seen that double resonance occurs around 27 GHz and around 31 GHz, and accordingly, the bandwidth is improved.

Figure 8:
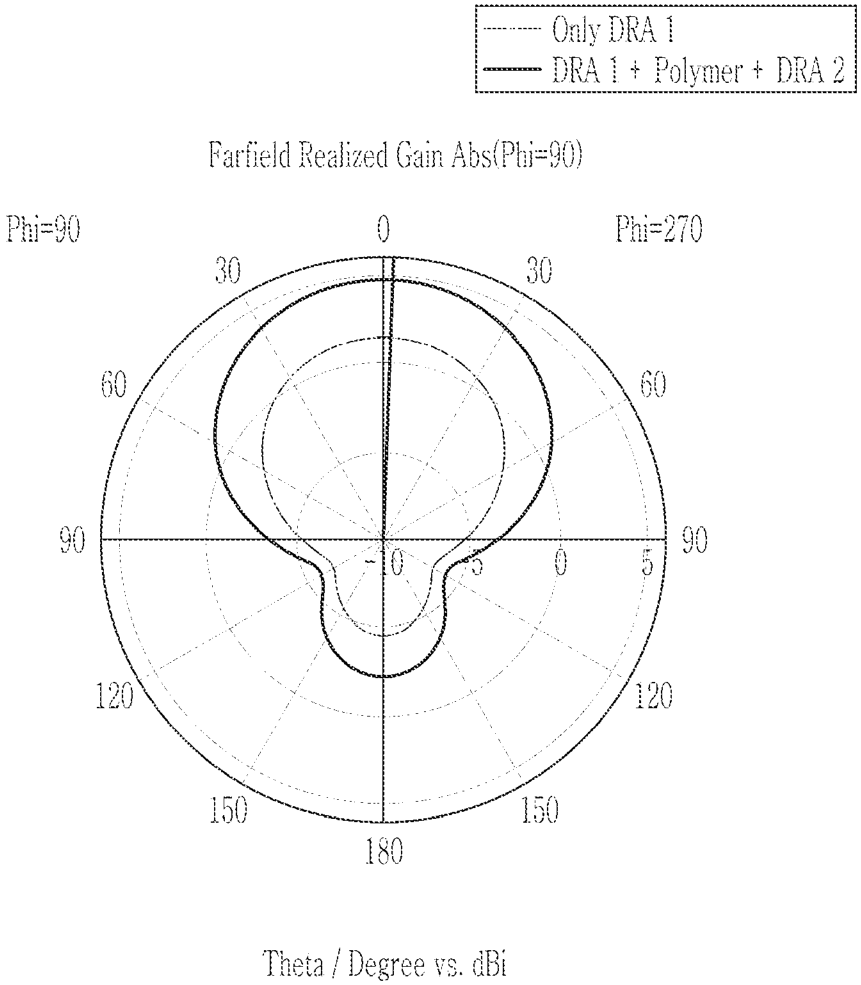
FIG. 8 is a graph showing a radiation characteristic as a result of simulation of the dielectric resonator antenna module illustrated in FIG. 3.

FIG. 8 illustrates a graph showing a radiation characteristic as a result of simulation of the DRA module 110 illustrated in FIG. 3.

FIG. 8 also shows a comparison of a radiation characteristic (solid line) of the DRA module 110 illustrated in FIG. 3 and a radiation characteristic (dotted line) of a single-layered DRA module in which only the first dielectric block 101 of the embodiment of FIG. 3 is included).

In the case of the single-layer DRA module, a maximum of 2 dB occurs around 0 degrees, but in the case of the DRA module 110 illustrated in FIG. 3, a maximum of 5 dB occurs around 0 degrees.

Figure 9:
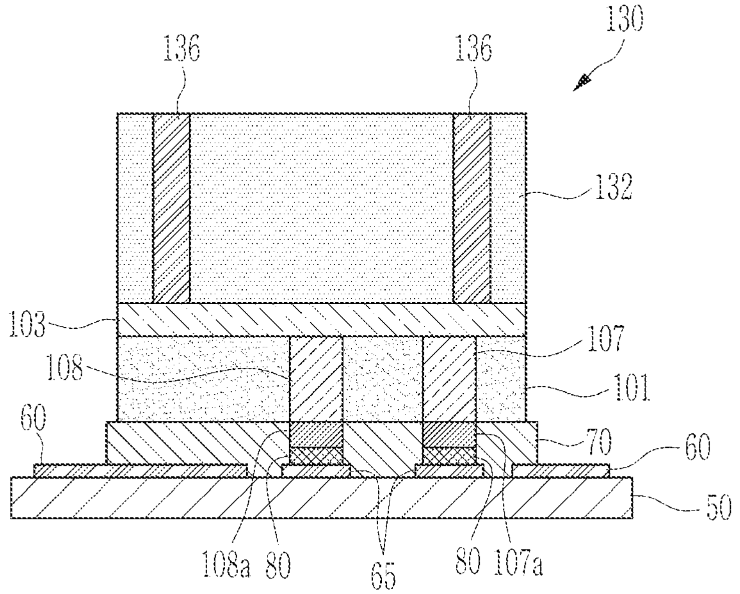
FIG. 9 is a cross-sectional view showing a dielectric resonator antenna module, according to another embodiment.
Figure 10:
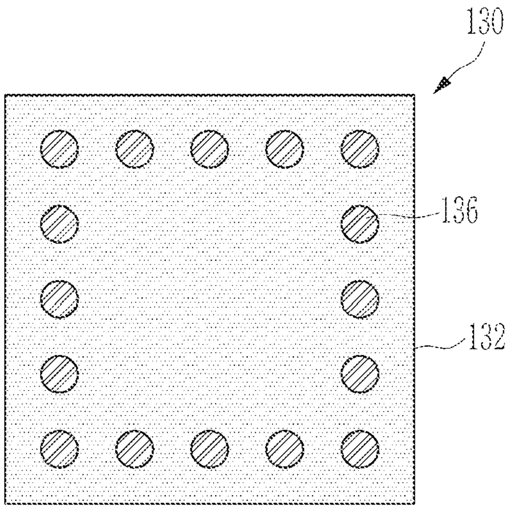
FIG. 10 is a top plan view showing the dielectric resonator antenna module illustrated in FIG. 9.

FIG. 9 is a cross-sectional view showing a DRA module 110, according to another embodiment. FIG. 10 is a top plan view showing the DRA module 130.

The DRA module 130 has a configuration that is similar to that of the DRA module 110 of FIG. 3, except that the DRA module 130 includes a second dielectric block 132 instead of the second dielectric block 102 of the DRA module 110. That is, the first dielectric block 101 and the second dielectric block 132 may be stacked on the board 50 through the polymer layer 103, and the feed unit may be formed in the first dielectric block 101 to extend in a direction that is perpendicular to the upper surface of the board 50. The feed unit may include the first feed via 107 and the second feed via 108 disposed to be spaced apart from each other in the first dielectric block 101, and the first and second feed vias 107 and 108 may pass through the first dielectric block 101 and may be electrically connected to the feed wire 65 on the board 50.

In the DRA module 130, a plurality of metal vias 136 may be disposed to be spaced apart from each other inside the second dielectric block 132 along a circumference thereof in a plan view. That is, the second dielectric block 132 may have an approximately rectangular or square planar shape, and the metal vias 136 may be adjacently arranged at an interval close to an inner side of each of four edges of the second dielectric block 132 to form a via wall in a rectangular or square pattern.

It is possible to ameliorate a loss due to a board mode (energy loss caused by energy radiated from the first dielectric block 101 being radiated to the side of the second dielectric block 132) and the change of a radiation pattern generated when the dielectric constant and thickness of the second dielectric block 132 are increased, by forming the metal vias 136 in the second dielectric block 132.

The metal vias 136 may be formed to penetrate the second dielectric block 132 in a vertical direction on a cross-section. Accordingly, the metal vias 136 may extend from the lower surface of the second dielectric block 132, which is in contact with the polymer layer 103, to the upper surface of the second dielectric block 132.

The second dielectric block 132 may have via holes having a cylindrical shape in order to form the metal vias 136, and such via holes may extend in a direction that is perpendicular to the upper surface of the board 50 when the second dielectric block 132 is stacked on the first dielectric block 101. Since the metal vias 136 are formed by filling interiors of the via holes with a metal material, each of the metal vias 136 may be formed to have a cylindrical shape, and may be formed to penetrate the second dielectric block 132 from the lower surface to the upper surface of the second dielectric block 132.

Although a structure in which the metal vias 136 are internally arranged along a circumference of the second dielectric block 132 has been shown, the arrangement of the metal vias 136 is not be limited to the foregoing description, and the metal vias 136 may be arranged at other positions within the second dielectric block 132.

Figure 11:
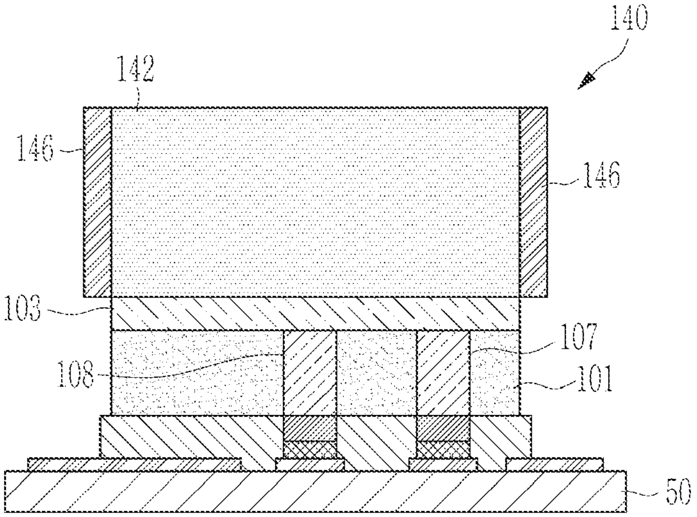
FIG. 11 is a cross-sectional view showing a dielectric resonator antenna module, according to another embodiment.
Figure 12:
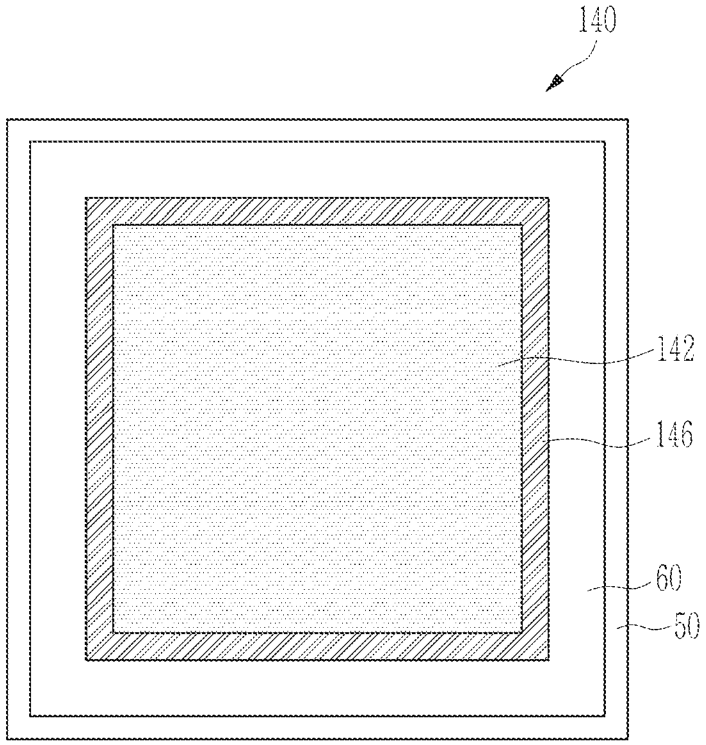
FIG. 12 is a top plan view showing the dielectric resonator antenna illustrated in FIG. 11.

FIG. 11 is a cross-sectional view showing a DRA module 140, according to another embodiment. FIG. 12 is a top plan view showing the DRA module 140.

The DRA module 140 of FIG. 11 has a configuration that is similar to that of the DRA 110 of FIG. 3, except that the DRA module 140 includes a second dielectric block 142 instead of the second dielectric block 102 of the DRA module 110. That is, the first dielectric block 101 and the second dielectric block 142 may be stacked on the board 50 through the polymer layer 103, and the feed unit may be formed in the first dielectric block 101 to extend in a direction that is perpendicular to the surface of the board 50. The feed unit may include the first feed via 107 and the second feed via 108 disposed to be spaced apart from each other in the first dielectric block 101, and the first and second feed vias 107 and 108 may pass through the first dielectric block 101 and may be electrically connected to the feed wire 65 on the board 50.

In the DRA module 140, a metal wall 146 may be formed on a lateral outer surface of the second dielectric block 142 along a circumference of the second dielectric block 142 in a plan view. That is, the second dielectric block 142 may have an approximately rectangular or square planar shape, and the metal wall 146 may be formed along the lateral outer surfaces of each of the four edges of the second dielectric block 142 to have a rectangular or square planar shape.

In addition, the metal wall 146 may be formed to surround the second dielectric block 142 on the cross-section. Accordingly, the metal wall 146 may extend in a vertical direction from the lower surface to the upper surface of the second dielectric block 142.

The metal wall 146 may be formed on the surface of the second dielectric block 142 by patterning a metal material, and thus it is possible to form a metal wall by patterning a metal material unless a blocking mode is formed anywhere on a hexahedron including the second dielectric block 142 and the polymer layer 103, thereby improving the radiation pattern without a large change in a bandwidth.

Figure 13:
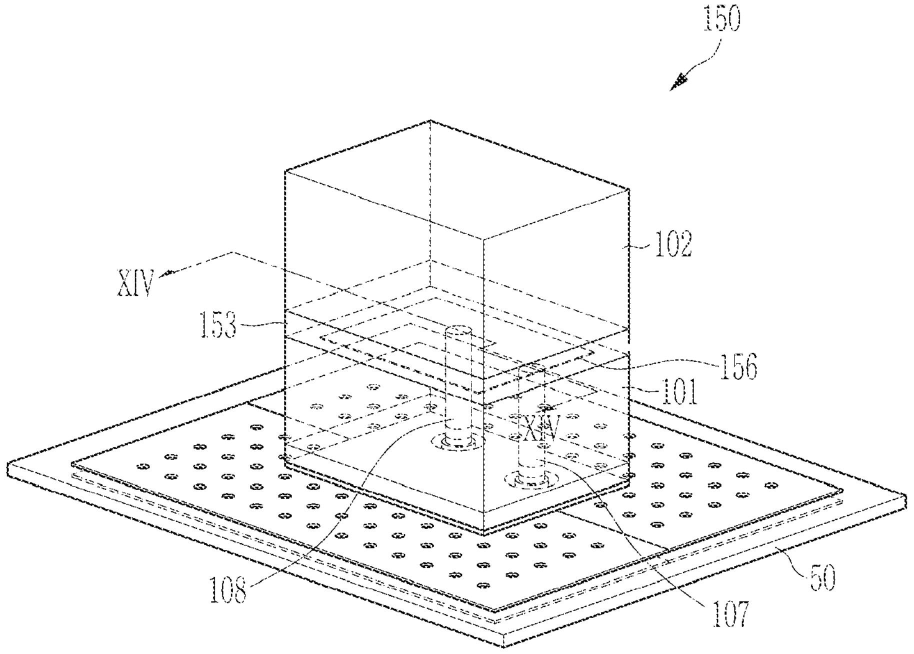
FIG. 13 is a perspective view showing a dielectric resonator antenna module, according to another embodiment.
Figure 14:
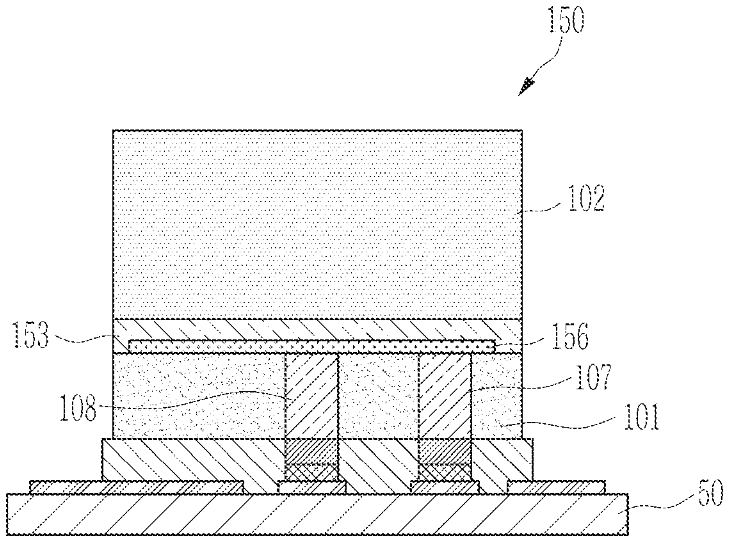
FIG. 14 is a cross-sectional view taken along a line XIV-XIV of FIG. 13.

FIG. 13 is a perspective view showing a DRA 150 module, according to another embodiment. FIG. 14 is a cross-sectional view taken along a line XIV-XIV of FIG. 13.

The DRA module 150 of FIGS. 13 and 14 has a configuration that is similar to that of the DRA module 110 shown in FIG. 3, except that the DRA module 150 includes a polymer layer 153 instead of the polymer layer 103 of the DRA module 110, and further includes a metal patch 156. That is, in the DRA module 150, the first dielectric block 101 and the second dielectric block 102 may be stacked on the board 50 through the polymer layer 153, and the feed unit may be formed in the first dielectric block 101 to extend in a direction that is perpendicular to the upper surface of the board 50. The feed unit may include the first feed via 107 and the second feed via 108 positioned to be spaced apart from each other in the first dielectric block 101, and may pass through the first dielectric block 101 and may be electrically connected to the feed wire 65 on the board 50.

A metal patch 156 may be attached to the upper surface of the first dielectric block 101. Accordingly, the metal patch 156 may be positioned under the second dielectric block 102 and the polymer layer 153. The metal patch 156 may be formed to have, for example, a rectangular or square plane shape, and may have a planar area smaller than a planar area of the first dielectric block 101.

The metal patch 156 may be disposed to be in contact with the first and second feed vias 107 and 108 to be electrically connected thereto. That is, the first and second feed vias 107 and 108 may extend from the lower surface to the upper surface of the first dielectric block 101 by penetrating though the first dielectric block 101, and may be in contact with the metal patch 156, which is positioned on the upper surface of the first dielectric block 101. Accordingly, the first and second feed vias 107 and 108 may contact a lower surface of the metal patch 156.

The metal patch 156 may be combined with the first and second feed vias 107 and 108, and the size and shape of the metal patch 156 may be changed, to improve a degree of freedom in designing the antenna.

Figure 15:
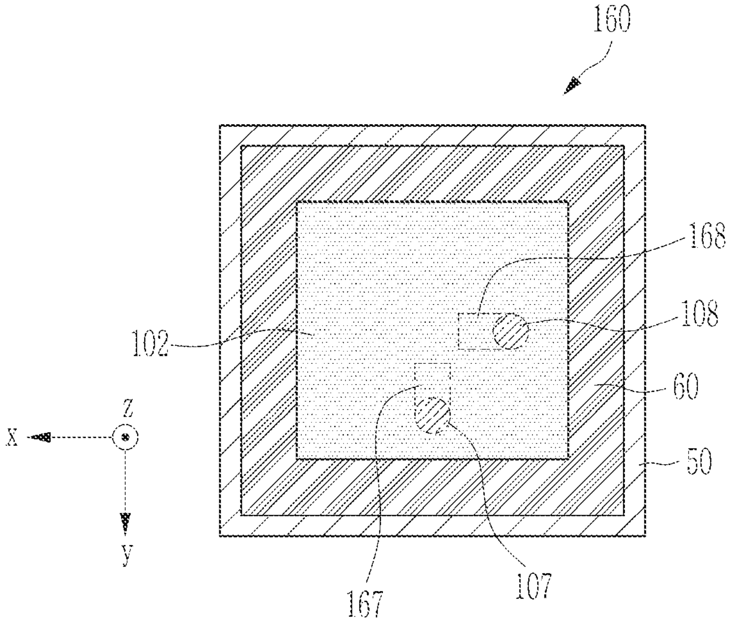
FIG. 15 is a top plan view showing a dielectric resonator antenna module, according to another embodiment.

FIG. 15 is a top plan view showing a DRA module 160, according to another.

The DRA module 160 has a configuration that is similar to that of the DRA module 150 of FIGS. 13 and 14, but the DRA module 160 includes a first patch 167 and a second patch 168 instead of the metal patch 156 of the DRA module 150. That is, the first dielectric block 101 and the second dielectric block 102 may be stacked on the board 50 through the polymer layer 153, and the feed unit may be formed in the first dielectric block 101 to extend in a direction that is perpendicular to the upper surface of the board 50. The feed unit may include the first feed via 107 and the second feed via 108 positioned to be spaced apart from each other in the first dielectric block 101, and the first feed via 107 and the second feed via 108 may pass through the first dielectric block 101 and may be electrically connected to the feed wire 65 on the board 50.

In the DRA module 160, a first patch 167 connected to the first feed via 107 and a second patch 168 connected to the second feed via 108 may be formed on the upper surface of the first dielectric block 101. Accordingly, the first and second patches 167 and 168 may be made of a metal and may be positioned under the second dielectric block 102 and the polymer layer 153, and, for example, may have a long rectangular plane shape in a single direction.

The first and second patches 167 and 168 may additionally adjust an impedance change by changing a length or direction of the first and second patches 167 and 168 without changing positions of the feed vias 107 and 108.

Figure 16:
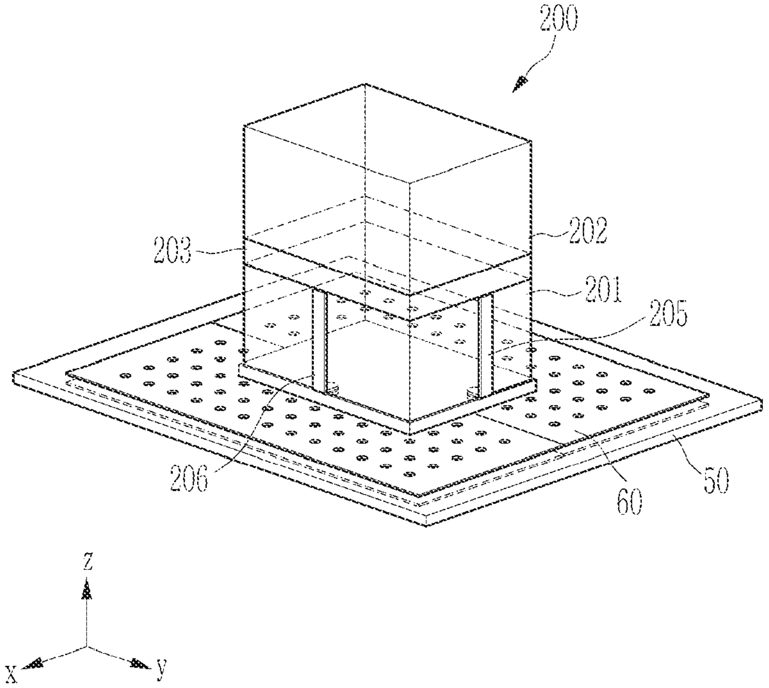
FIG. 16 is a perspective view showing a dielectric resonator antenna module, according to another embodiment.
Figure 17:
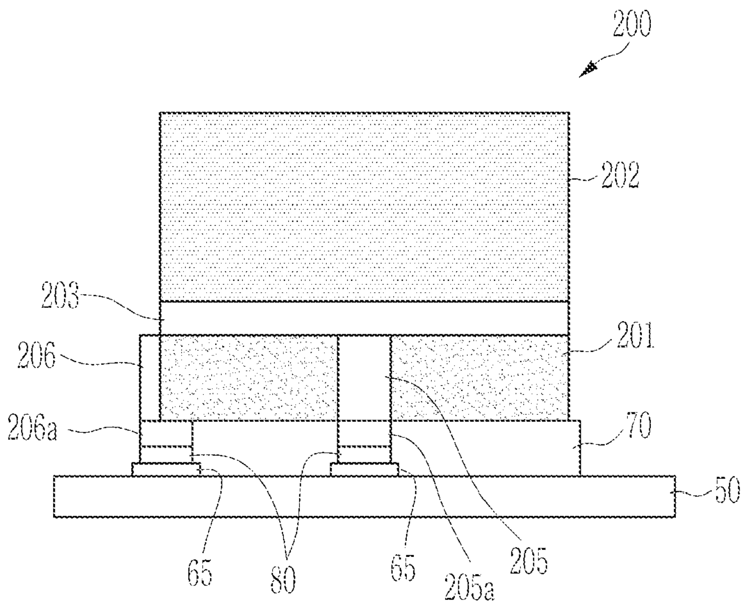
FIG. 17 is a side view showing the dielectric resonator antenna module illustrated in FIG. 16.

FIG. 16 is a perspective view showing a DRA module 200, according to another embodiment. FIG. 17 is a side view showing the DRA module 200.

In the DRA module 200, a first dielectric block 201 and a second dielectric block 202 may be stacked on the board 50 via a polymer layer 203, and a feed unit may include a first strip 205 and second feed strip 206 disposed on side surfaces of the first dielectric block 201. The first and second feed strips 205 and 206 may extend in a direction that is perpendicular to the upper surface of the board 50.

The first and second feed strips 205 and 206 may be positioned on the outer surface of the first dielectric block 201. The first feed strip 205 and the second feed strip 206 may be positioned at different side surfaces of the first dielectric block 201 and may extend parallel to each other. For example, the first feed strip 205 may transfer a first RF signal having a first polarization, and the second feed strip 206 may transfer a second RF signal having a second polarization. The first RF signal is a signal that forms an electric field and a magnetic field in x and y directions perpendicular to each other and perpendicular to a propagation direction (e.g., z direction), and the second polarization RF signal may be a signal that forms a magnetic field and an electric field in the x and y directions, respectively.

Connection pads 205*a* and 206*a* may be formed at end portions of the first and second feed strips 205 and 206, respectively, on the lower surface of the first dielectric block 201. The connection pads 205*a* and 206*a* may be connected to the feed wire 65 of the board 50 through a solder ball 80, so that the first and second feed strips 205 and 206 may be electrically connected to the board 50.

When the first dielectric block 201 is mounted on the board 50, after connecting the connection pads 205*a* and 206*a* to the feed wire 65, a hole between the first dielectric block 201 and the board 50 may be filled with the underfill material 70 to be cured. The cured underfill material 70 may be to surround a portion in which the connection pads 205*a* and 206*a* are connected to a wire of the board 50 through the solder ball 80, thereby supporting the first dielectric block 201 to be firmly fixed on the board 50. In addition, the underfill material 70 may fill a space between the first dielectric block 201 and the board 50 to prevent dust or moisture from permeating from the outside, thereby preventing insulation at the connection portion from being damaged or malfunctioning.

Figure 18:
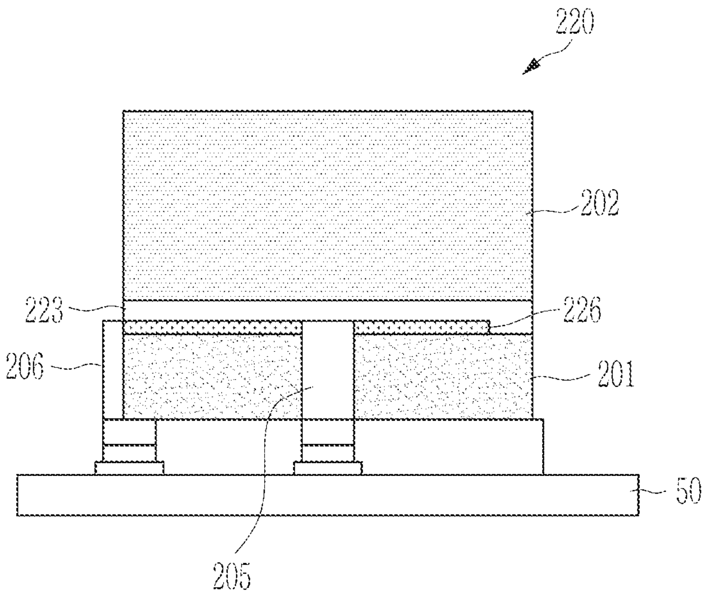
FIG. 18 is a side view showing a dielectric resonator antenna module, according to another embodiment.

FIG. 18 is a side view showing a DRA module 220, according to another embodiment.

The DRA module 220 has a configuration that is similar to that of the DRA module 200 of FIG. 17, except that the DRA module 210 includes a polymer layer 223 instead of the polymer layer 203 of the DRA module 200, and further includes a metal patch 226. That is, in the DRA module 220, the first dielectric block 201, and the second dielectric block 202 may be stacked on the board 50 via the polymer layer 223, and the first and second feed strips 205 and 206 may be provided at a side surface of the first dielectric block 201 to extend in a direction that is perpendicular to a surface of the board 50.

The metal patch 226 may be attached to the upper surface of the first dielectric block 201. Accordingly, the metal patch 226 may be positioned under the second dielectric block 202 and the polymer layer 223. The metal patch 226 may have, for example, a rectangular or square plane shape, and may be have a planar area smaller than a planar area of the first dielectric block 201.

The metal patch 226 may be disposed to be in contact with the first and second feed strips 205 and 206 to be electrically connected thereto. For example, when the first feed strip 205 and the second feed strip 206 positioned at two side surfaces of the first dielectric block 201 that are adjacent to each other, the metal patch 226 may be positioned such that edges of the two side surfaces of the first dielectric block 201 are exposed. The first and second feed strips 205 and 206 may be formed to extend and contact the metal patch 226, which is positioned on the upper surface of the first dielectric block 201.

The structure in which the second dielectric block 202 is stacked on the first dielectric block 201 via the polymer layer 223 has been described above, but a DRA module configured by stacking N dielectric blocks in a single direction (where N is an integer that is greater than 2) may also be provided. A polymer layer may be disposed between dielectric blocks stacked in each step of the DRA module having N dielectric blocks to form N−1 polymer layers. Hereinafter, various structures for forming metal vias for impedance matching with a feed unit in a DRA module formed by stacking N dielectric blocks and N−1 polymer layers, as described above, will be described.

Figure 19:
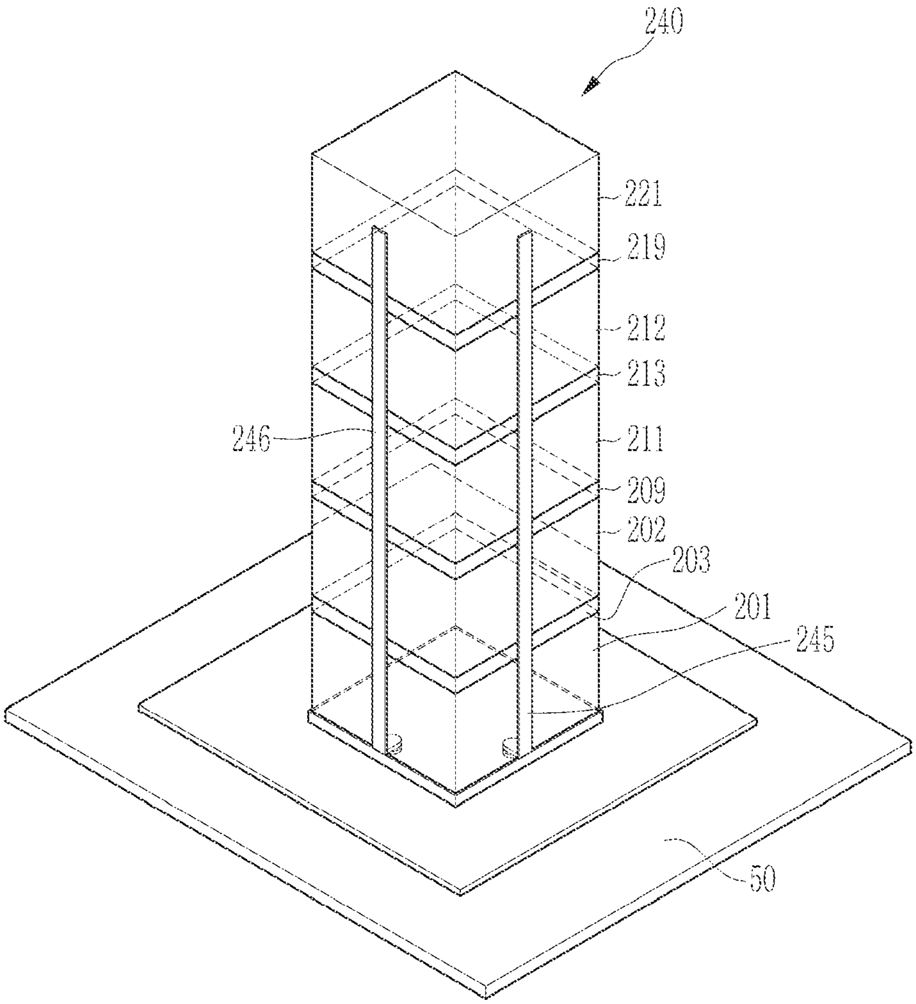
FIG. 19 is a perspective view showing a dielectric resonator antenna module, according to another embodiment.
Figure 20:
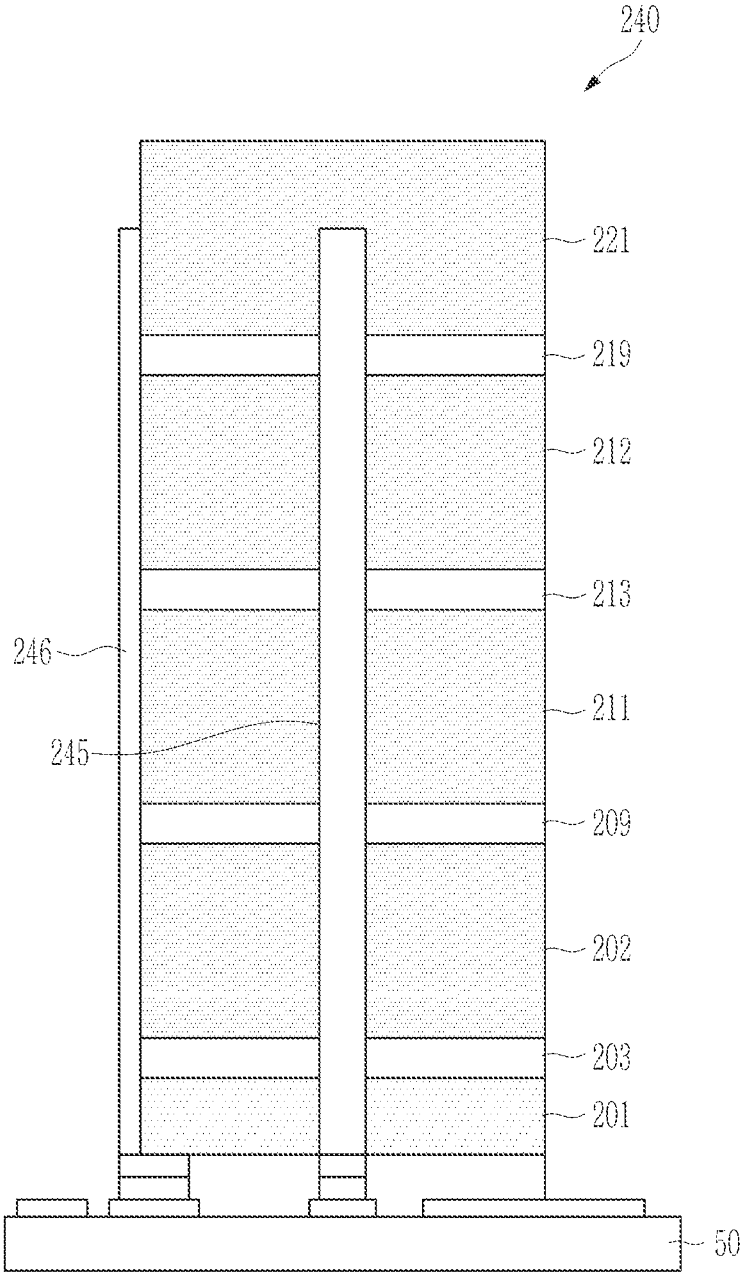
FIG. 20 is a side view showing the dielectric resonator antenna module illustrated in FIG. 19.

FIG. 19 is a perspective view showing a DRA module 240, according to another embodiment. FIG. 20 is a side view showing the DRA module 240.

Referring to FIGS. 19 and 20, the DRA module 240 may be configured by stacking five dielectric blocks 201, 202, 211, 212, and 221 on the board 50 in a single direction, and four polymer layers 203, 209, 213, and 219 may be respectively disposed at regions between adjacent dielectric blocks among the dielectric blocks 201, 202, 211, 212, and 221.

A first feed strip 245 and a second feed strip 246 may be disposed on side surfaces of the five dielectric blocks 201, 202, 211, 212, and 221 so as to extend in a direction that is perpendicular to the surface of the board 50. The first feed strip 245 and the second feed strip 246 may be positioned on the outer surfaces of the five dielectric blocks 201, 202, 211, 212, and 221. The first feed strip 245 and the second feed strip 246 may be disposed on different side surfaces of the five dielectric blocks 201, 202, 211, 212, and 221 to extend parallel to each other, and may extend from a bottom edge of the lowermost dielectric block 201 to a side surface of the uppermost dielectric block 221.

A structure in which five dielectric blocks are stacked has been described with respect to FIG. 19, but a DRA module may include N dielectric blocks and N−1 polymer layers disposed between adjacent dielectric blocks among the dielectric blocks (where N is an integer that is greater than 2). In this case, the DRA module may include a feed strip extending from the side surfaces of the N dielectric blocks in a direction perpendicular to the upper surface of the board.

FIGS. 21 to 33 illustrate cross-sectional views showing DRA modules 310, 320, 330, 340, 410, 420, 430, 440, 510, 520, 530, and 550, according to other embodiments. FIGS. 21 and 23 to 33 are cross-sectional views of the DRA modules 310, 320, 330, 340, 410, 420, 430, 440, 510, 520, 530, and 550, and FIG. 22 illustrates a top plan view showing the DRA module 310 illustrated in FIG. 21.

Referring to FIGS. 21 to 33, DRA modules 310, 320, 330, 340, 410, 420, 430, 440, 510, 520, 530, and 550 may be configured by stacking N dielectric blocks on the board 50 in a single direction, and N−1 polymer layers may be respectively disposed at regions between adjacent dielectric blocks among the dielectric blocks (where N is an integer that is greater than 2). That is, the dielectric blocks may include a lowermost dielectric block fixed on the board 50, an uppermost dielectric block positioned on an uppermost layer, and N−2 intermediate layer dielectric blocks stacked therebetween.

A feed via may be formed in a lowermost dielectric block to extend in a direction that is perpendicular to the surface of the board 50. The feed vias may include a first feed via and a second feed via spaced apart from each other in the lowermost dielectric block. The feed via may pass through the lowermost dielectric block so that an upper end thereof is in contact with a lower surface of the lowermost polymer layer, and a lower end thereof may be electrically connected to the feed wire 65 on the board.

A metal via may be formed in the intermediate layer dielectric block or the uppermost dielectric block in the dielectric resonator antenna modules 310, 320, 330, and 340, according to the embodiments illustrated in FIGS. 21 to 25.

Figure 21:
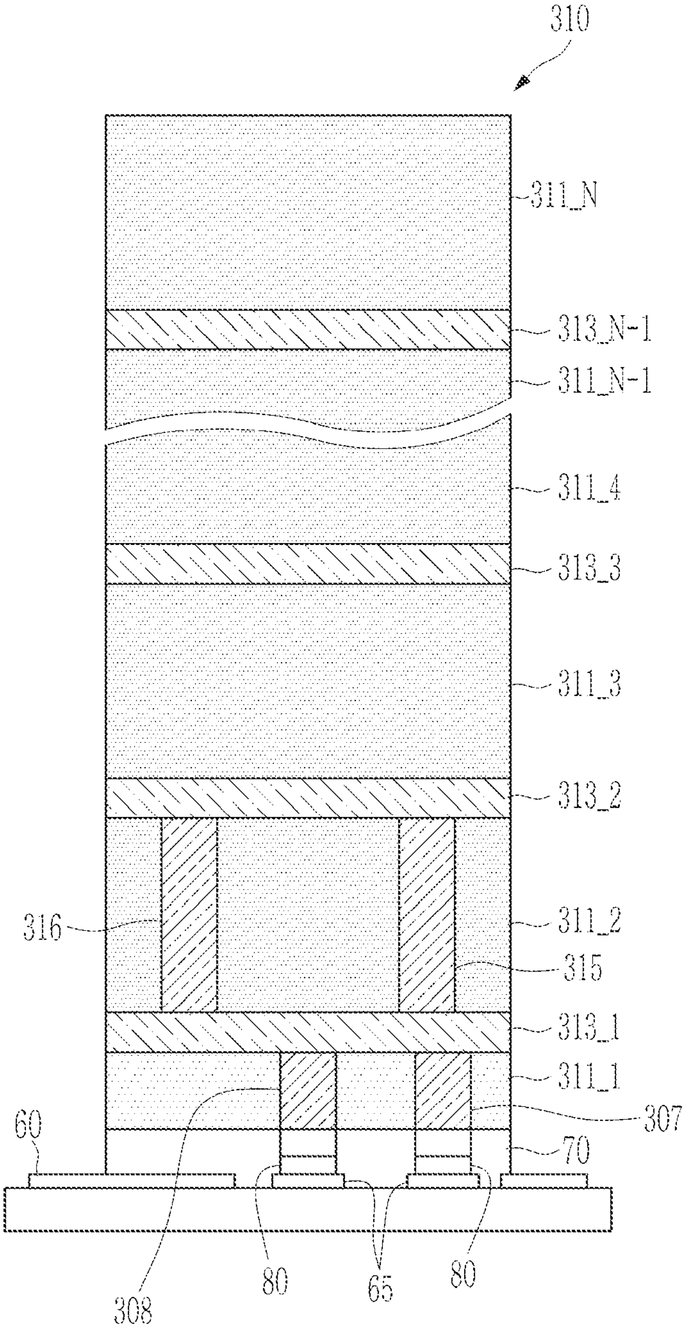
FIG. 21 is a cross-sectional view showing a dielectric resonator antenna module, according to another embodiment.
Figure 22:
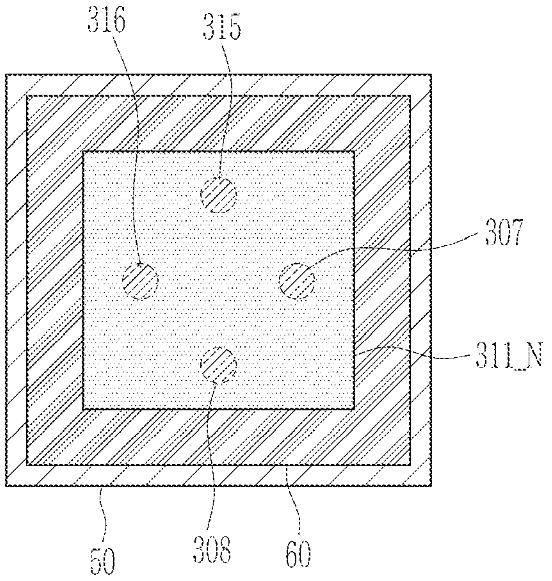
FIG. 22 is a top plan view showing the dielectric resonator antenna illustrated in FIG. 21.

Referring to FIG. 21, in the DRA module 310, a first metal via 315 and a second metal via 316 are formed in a first intermediate layer dielectric block 311_2 and are not formed in second or greater intermediate layer dielectric blocks 311_3, 311_4, and 311_N−1, and an uppermost dielectric block 311_N. A first feed via 307 and a second feed via 308 may be formed in a lowermost dielectric block 311_1 to extend in a direction that is perpendicular to the surface of the board 50. The first feed via 307 and a second feed via 308 may be spaced apart from each other in the lowermost dielectric block 311_1. The first and second feed vias 307 and 308 may pass through the lowermost dielectric block 311_1 so that upper ends of the first and second feed vias 307 and 308 are in contact with the lower surface of the lowermost polymer layer 313_1 among polymer layers 313_1 to 313_N−1, and lower ends of the first and second feed vias 307 and 308 may be electrically connected to the feed wire 65 on the board 50. Referring to FIG. 22, the first and second metal vias 315 and 316 may be positioned anywhere on a plane of the intermediate layer dielectric block 311_2, and may be positioned depending on an impedance matching design.

The first metal via 315 and the second metal via 316 may extend in a direction that is perpendicular to the surface of the board 50 and may be spaced apart from each other. In addition, the first and second metal vias 315 and 316 may be formed to penetrate the first intermediate layer dielectric block 311_2 to contact upper and lower surfaces, respectively, of the adjacent polymer layers 313_1 and 313_2.

Figure 23:
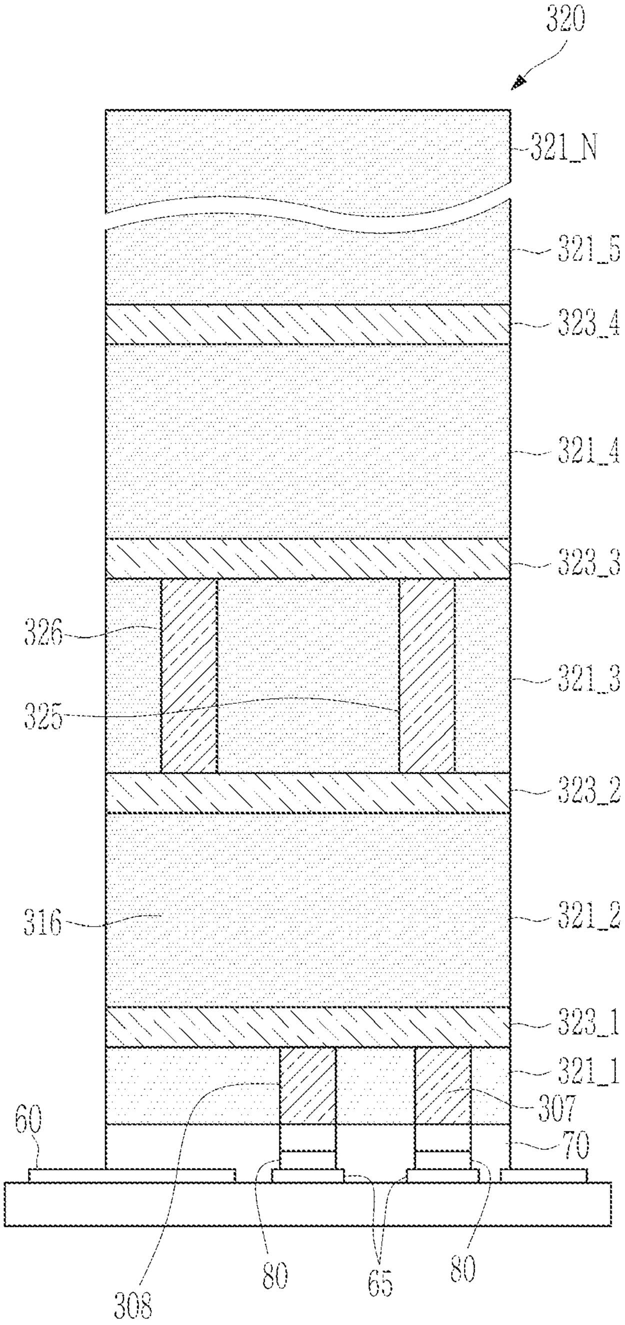
FIG. 23 to FIG. 33 are cross-sectional views showing dielectric resonator antenna modules, according to other embodiments.

Referring to FIG. 23, in the DRA module 320, a first metal via 325 and a second metal via 326 are formed in a second intermediate layer dielectric block 321_3, and are not formed in remaining intermediate layer dielectric blocks 321_2, 321_4, and 321_5 and an uppermost dielectric block 321_N.

The DRA module 320 includes polymer layers 321_1 to 321_N−1. The first and second metal vias 325 and 326 may be formed to penetrate the second intermediate layer dielectric block 321_3 to contact upper and lower surfaces, respectively, of the adjacent polymer layers 323_2 and 323_3.

Additionally, the first and second feed vias 307 and 308 may pass through the lowermost dielectric block 321_1.

Figure 24:
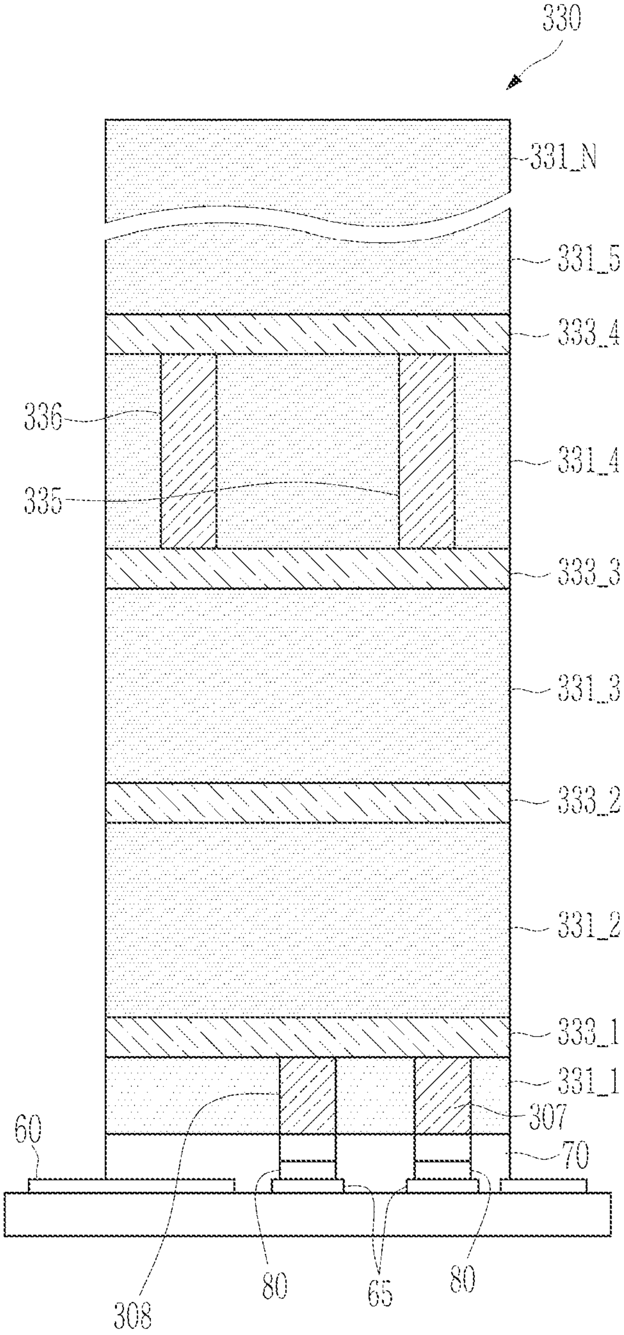

Referring to FIG. 24, in the DRA module 330, a first metal via 335 and a second metal via 336 are formed in a third intermediate layer dielectric block 331_3, and are not formed in remaining intermediate layer dielectric blocks 331_2, 331_3, and 331_5, and an uppermost dielectric block 331_N.

The first and second metal vias 335 and 336 may be formed to penetrate the third intermediate layer dielectric block 331_3 to contact upper and lower surfaces, respectively, of the adjacent polymer layers 333_3 and 333_4.

Additionally, the first and second feed vias 307 and 308 may pass through the lowermost dielectric block 331_1.

Figure 25:
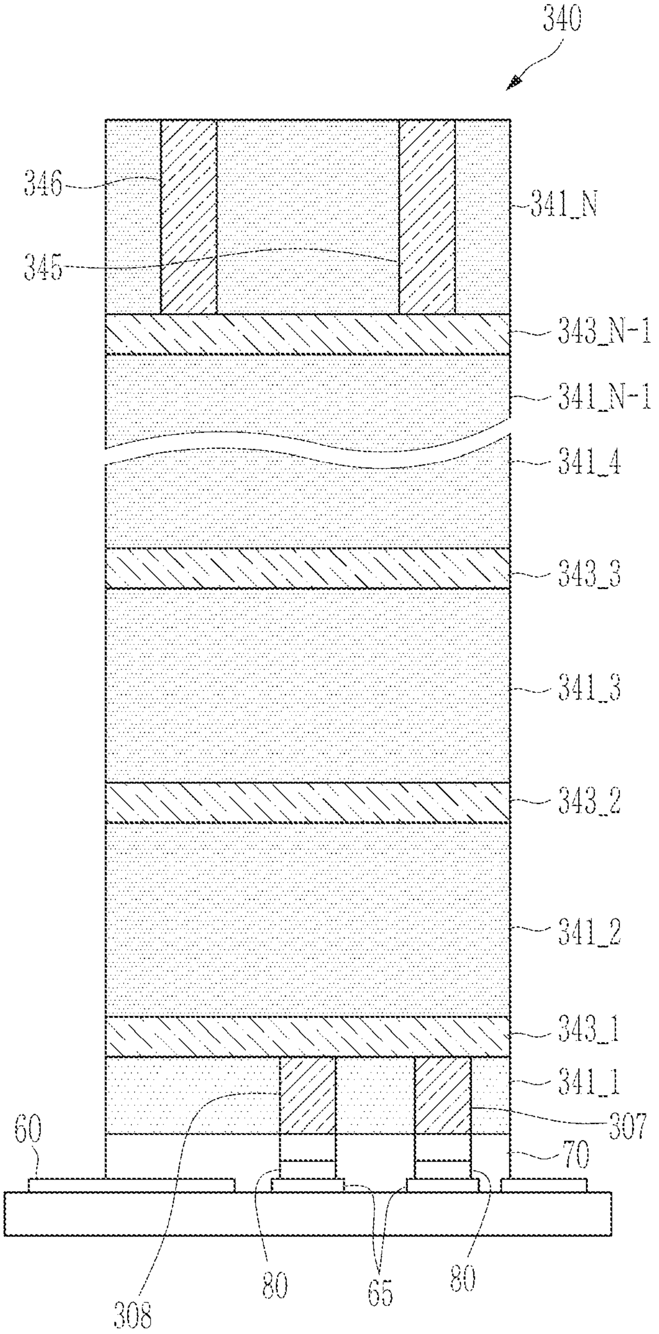

Referring to FIG. 25, in the DRA module 340, a first metal via 345 and a second metal via 346 are formed in an uppermost dielectric block 341_N. The first metal via 345 and the second metal via 346 may extend in a direction that is perpendicular to the surface of the board 50 and may be spaced apart from each other. In addition, the first and second metal vias 345 and 346 may be formed such that lower ends of the metal vias 345 and 346 penetrate the uppermost dielectric block 341_N to be in contact with an upper surface of the adjacent polymer layer 343_N−1 among polymer layers 343_1 to 343_N−1. The metal vias 345 and 346 are not formed in the intermediate layer dielectric blocks 341_2, 341_3, 341_4, and 341_N−1.

Additionally, the first and second feed vias 307 and 308 may pass through the lowermost dielectric block 341_1.

In the DRA modules 410, 420, 430, and 440 according to the embodiments shown in FIGS. 26 to 29, respectively, first and second feed vias 407 and 408 are formed in a respective lowermost dielectric block 411_1, 421_1, 431_1, or 441_1. Further, in the DRA modules 410, 420, 430, and 440, a metal via may be formed in an intermediate layer dielectric block 411_2, 421_3, or 431_4, or the uppermost dielectric block 441_N to penetrate a polymer layer that is adjacent thereto in the.

Figure 26:
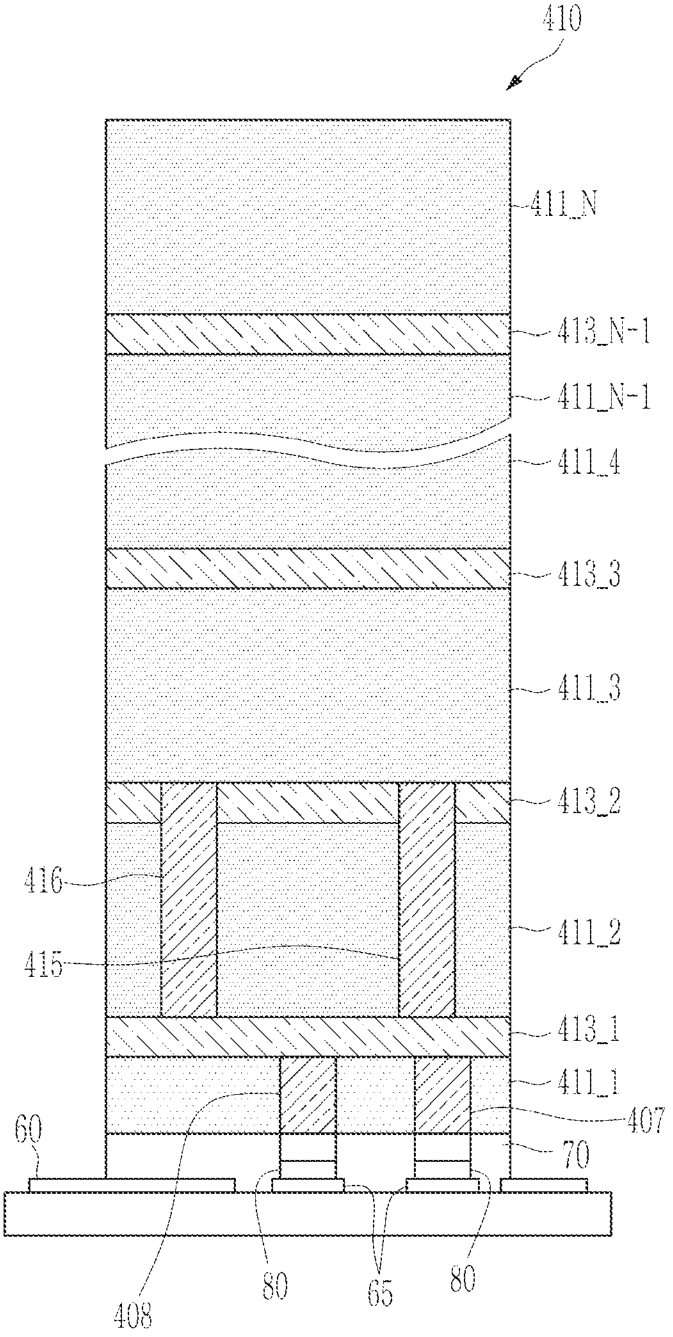

Referring to FIG. 26, in the DRA module 410, a first metal via 415 and a second metal via 416 may be formed in the first intermediate layer dielectric block 411_2, and may be extended to penetrate a second polymer layer 413_2 among polymer layers 413_1 to 413_N−1.

Figure 27:
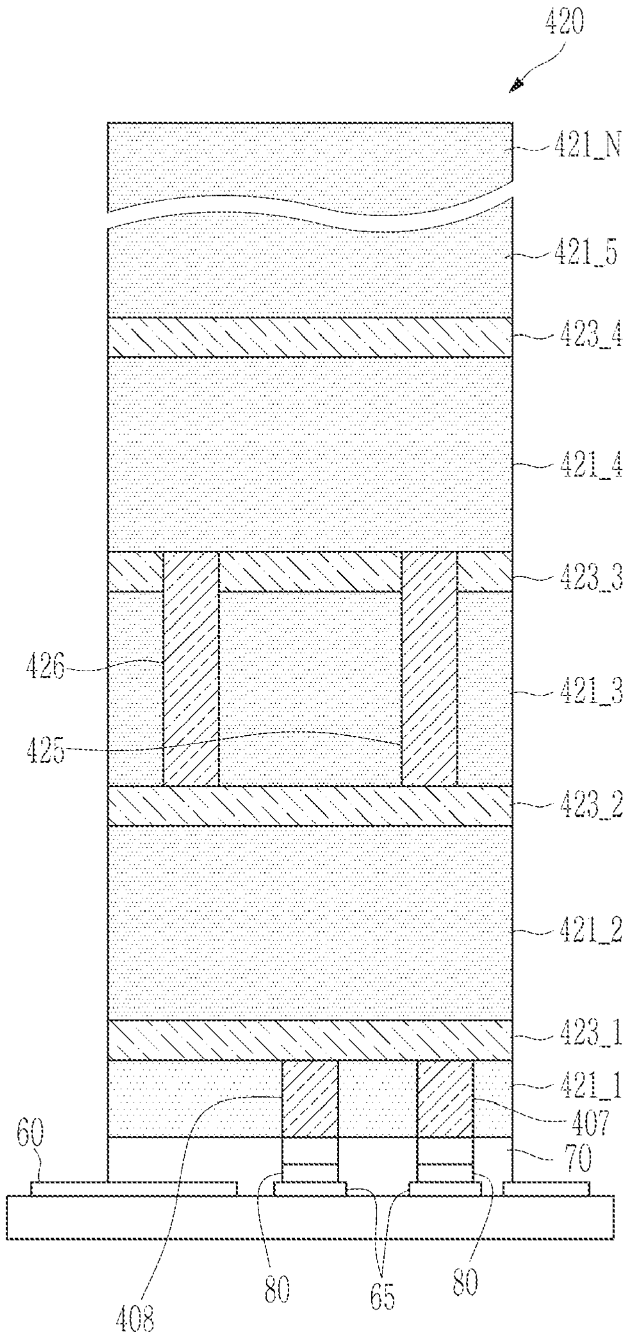

Referring to FIG. 27, in the DRA module 420, a first metal via 425 and a second metal via 426 may be formed in the second intermediate layer dielectric block 421_3, and may be extended to a third polymer layer 423_3.

Figure 28:
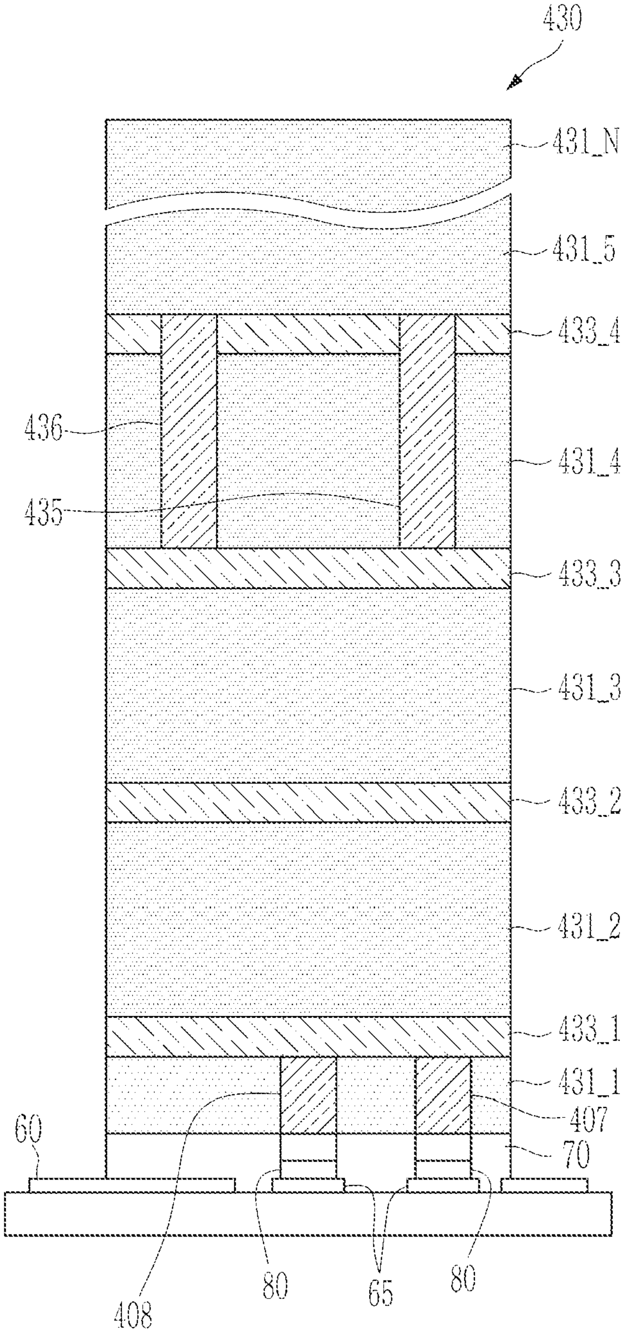

Referring to FIG. 28, in the DRA module 430, a first metal via 435 and a second metal via 436 may be formed in formed in the third intermediate layer dielectric block 431_4, and may be extended to penetrate the fourth polymer layer 433_4.

Figure 29:
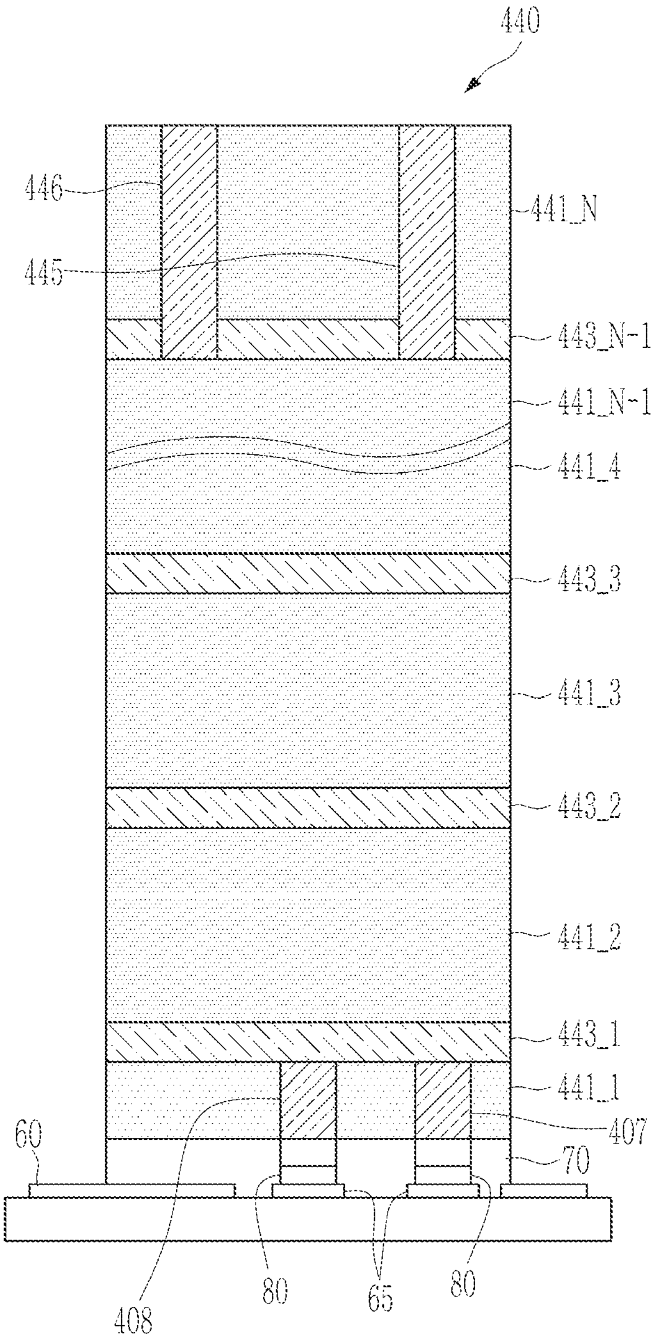

Referring to FIG. 29, a first metal via 445 and a second metal via 446 may be formed in the uppermost dielectric block 441_N, and may extend to penetrate a polymer layer 443_N−1 immediately therebelow.

In DRA modules 510, 520, 530, and 540 according to the embodiments illustrated in FIGS. 30 to 33, a metal via may be formed in a plurality of intermediate layer dielectric blocks or an intermediate layer dielectric block and an uppermost dielectric block, and the metal vias may extend to penetrate a polymer layer disposed between the dielectric blocks.

Figure 30:
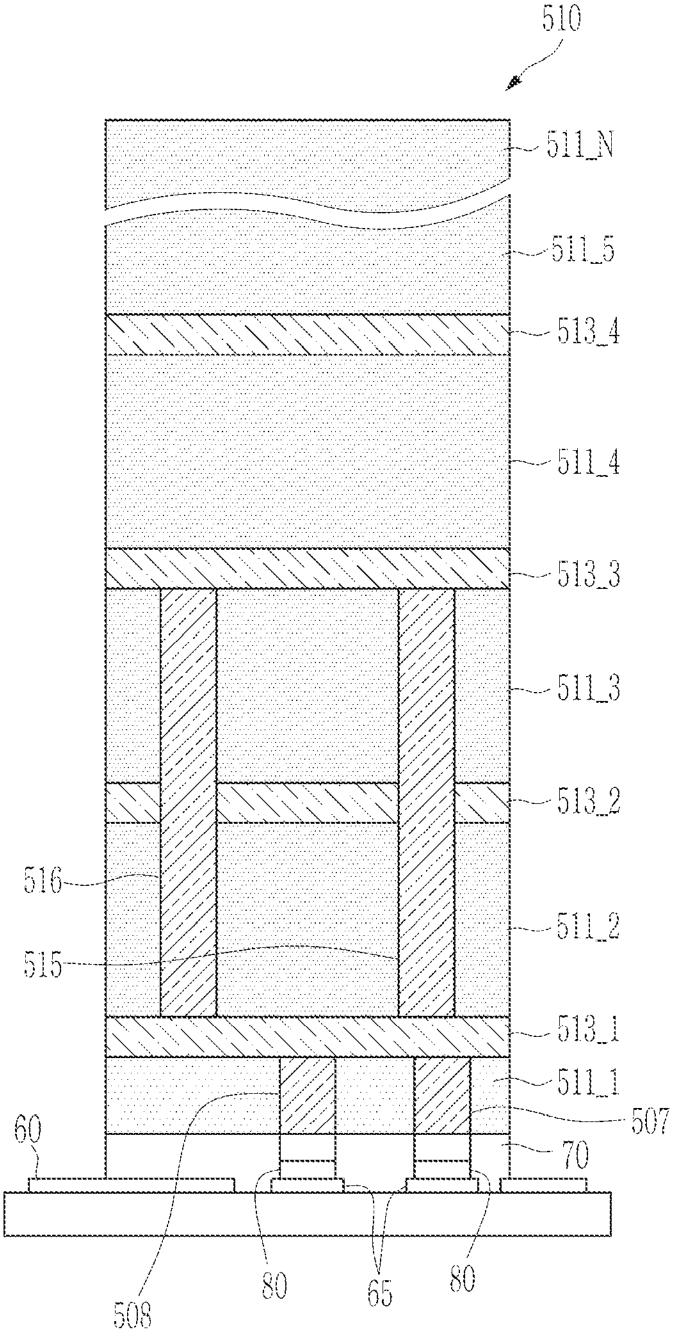

Referring to FIG. 30, in the DRA module 510, a first metal via 515 and a second metal via 516 may be formed in the first and second intermediate layer dielectric blocks 511_2 and 511_3, among dielectric blocks 511_1 to 511_N. The first and second metal vias 515 and 516 may extend to penetrate a polymer layer 513_2, among polymer layers 513_1 to 513_N−1, disposed between first and second intermediate layer dielectric blocks 511_2 and 511_3.

Additionally, first and second feed vias 507 and 508 may pass through the lowermost dielectric block 511_1.

Figure 31:
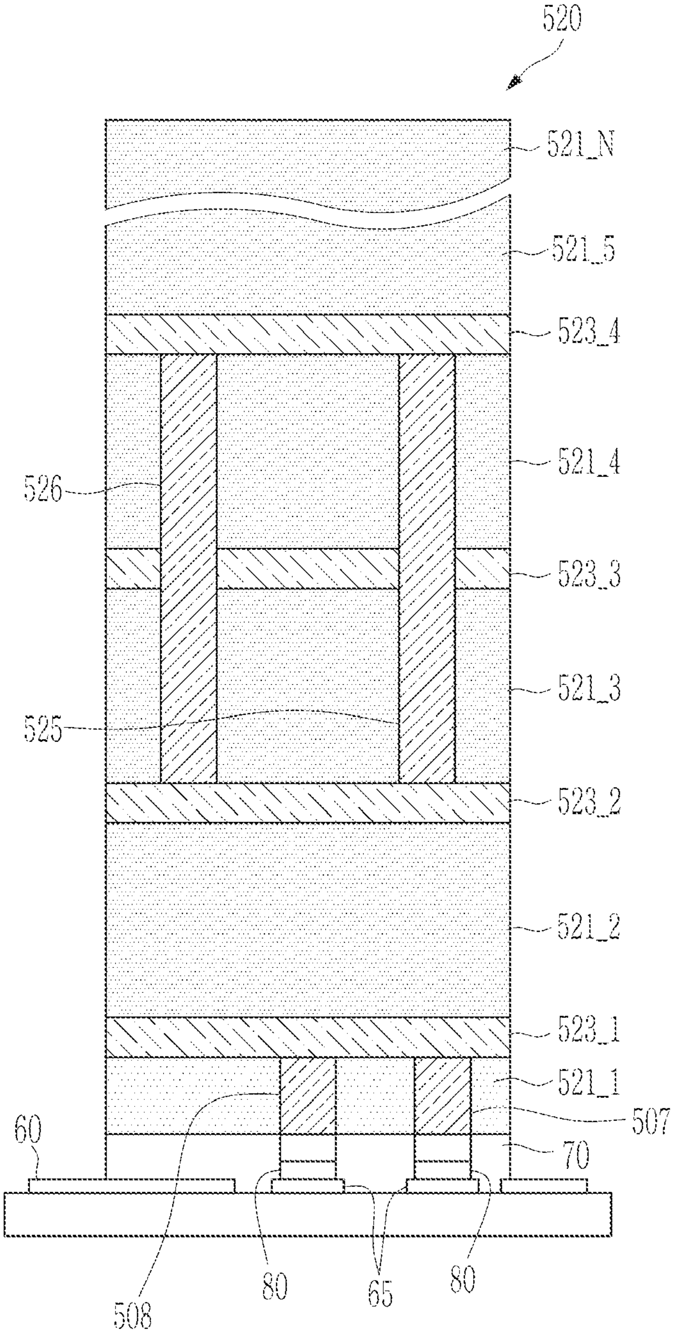

Referring to FIG. 31, in the DRA module 520, a first metal via 525 and a second metal via 526 may be formed in the second and third intermediate layer dielectric blocks 521_3 and 521_4, among dielectric blocks 521_1 to 521_N. The first and second metal vias 525 and 526 may extend to penetrate a polymer layer 523_3, among polymer layers 523_1 to 523_N−1, disposed between the second and third intermediate layer dielectric blocks 521_3 and 521_4.

Additionally, the first and second feed vias 507 and 508 may pass through the lowermost dielectric block 521_1.

Figure 32:
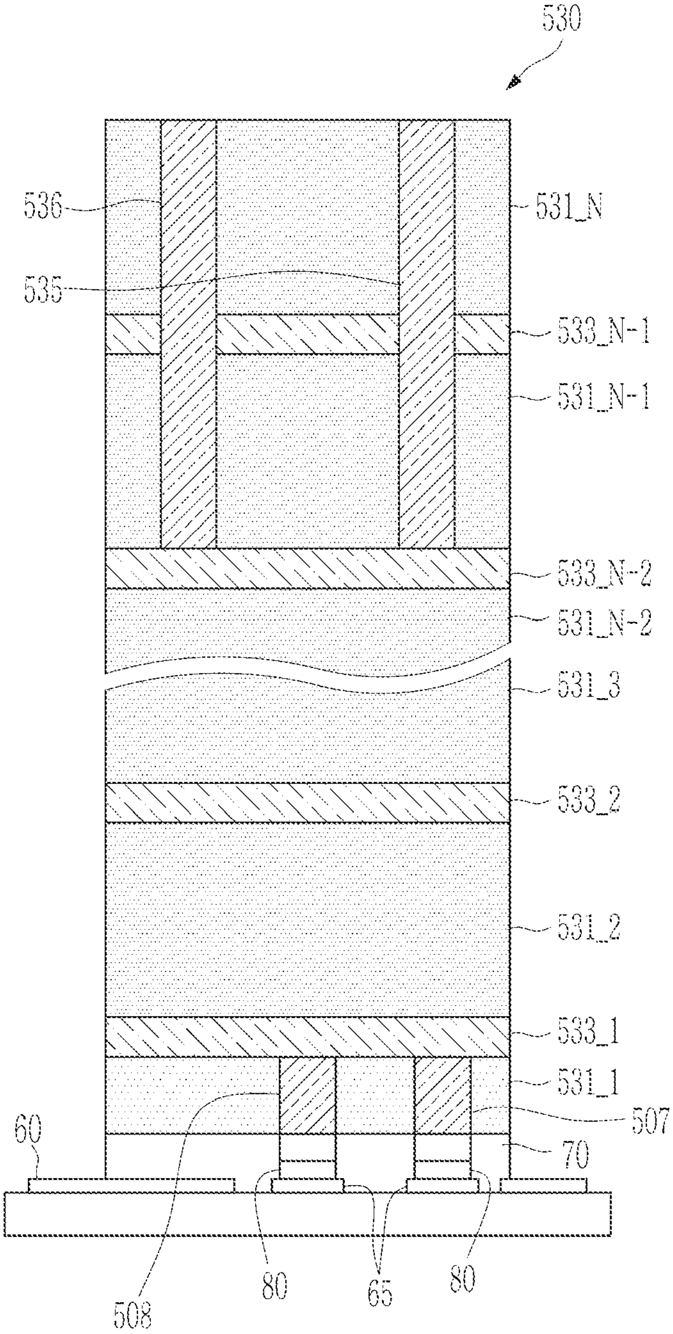

Referring to FIG. 32, in the DRA module 530, a first metal via 535 and a second metal via 536 may be formed in an uppermost dielectric block 531_N and an intermediate layer dielectric block 533_N−1, among dielectric blocks 531_1 to 531_N. The first and second metal layers 535 and 536 may extend to penetrate a polymer layer 533_N−1, among polymer layers 533_1 to 533_N−1, disposed between the uppermost dielectric block 531_N and the intermediate layer dielectric block 533_N−1 therebelow.

Additionally, the first and second feed vias 507 and 508 may pass through the lowermost dielectric block 531_1.

Figure 33:
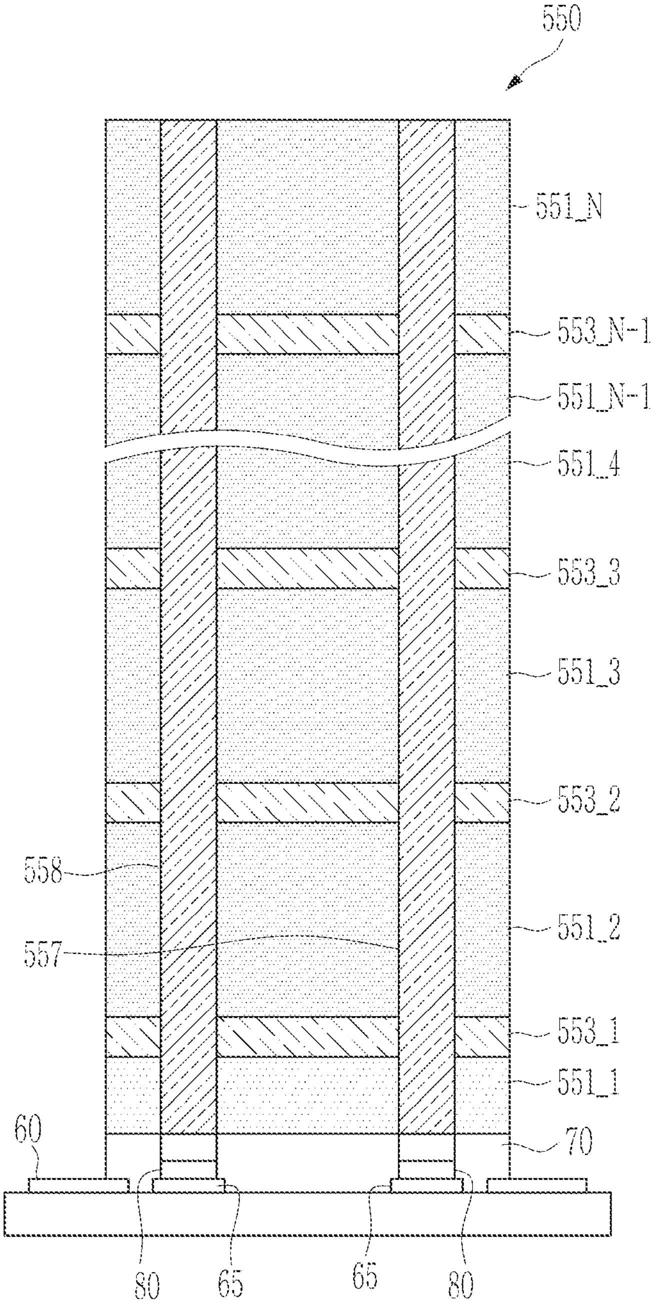

Referring to FIG. 33, in the DRA module 550, a first metal via 557 and a second metal via 558 may be formed in dielectric blocks 551_1 through 551_N. The first and second metal vias 557 and 558 may extend to penetrate polymer layers 553_1 through 553_N−1 interposed between adjacent dielectric blocks among the dielectric blocks 551_1 through 551_N. The portions of the metal vias 557 and 558 formed in the lowermost dielectric block 551_1 may function as feed vias.

FIG. 34 to FIG. 39 are cross-sectional views showing DRA modules 610, 620, 630, 640, 650, and 660, respectively, according to other embodiments.

In the DRA modules 610, 620, 630, 640, 650, and 660, a lower dielectric block 601 and an upper dielectric block 612, 622, 632, 642, 652, or 662 may be stacked on the board 50 via a polymer layer 603. A first feed via 607 and a second feed via 608 may be formed in the lower dielectric block 601 so as to extend in a direction that is perpendicular to the surface of the board 50, may penetrate the lower dielectric block 601, and may be electrically connected to the feed wire 65 on the board 50.

Lower surfaces of the upper dielectric blocks 612, 622, 632, 642, 652, and 662 may be bonded to an upper surface of the lower dielectric block 601 through the polymer layer 603. The upper dielectric blocks 612, 622, 632, 642, 652, and 662 may be formed to have various shapes, which will be described in detail below with reference to respective drawings.

Figure 34:
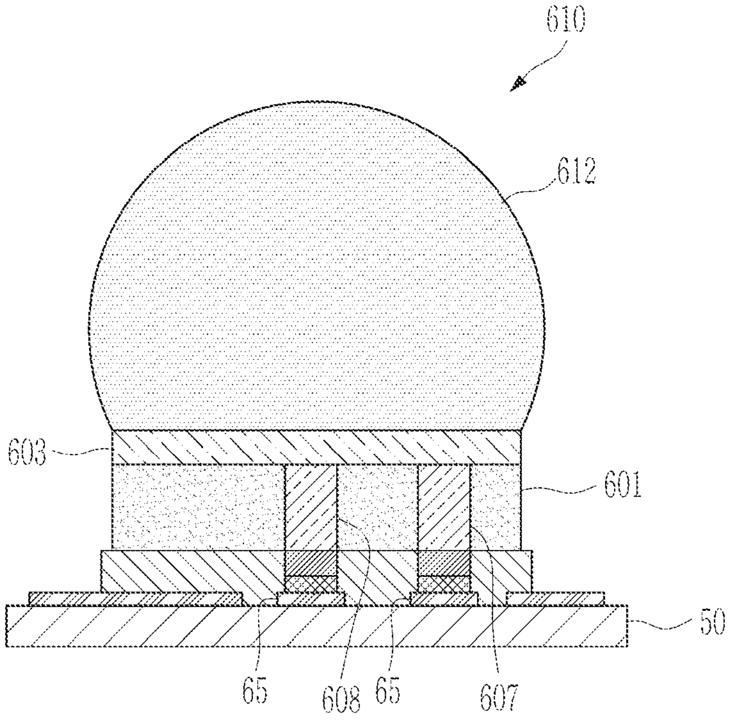
FIG. 34 to FIG. 39 are cross-sectional views showing dielectric resonator antenna modules, according to other embodiments.

In the DRA module 610 illustrated in FIG. 34, the upper dielectric block 612 may have a substantially hemispherical shape that rises convexly with a curved surface.

Figure 35:
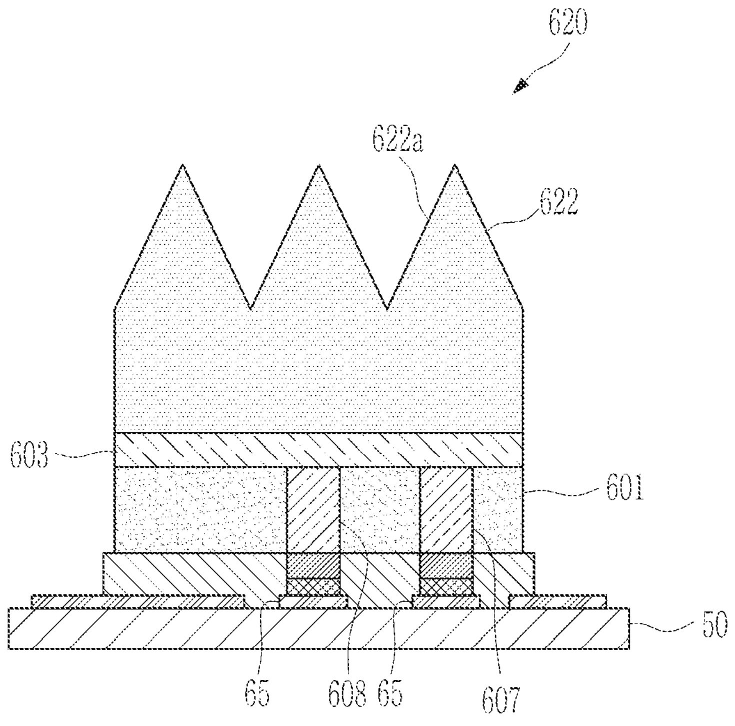

In the DRA module 620 illustrated in FIG. 35, the upper dielectric block 622 may have a shape having a plurality of tip or sawtooth portions **622*a*** tapered upward.

Figure 36:
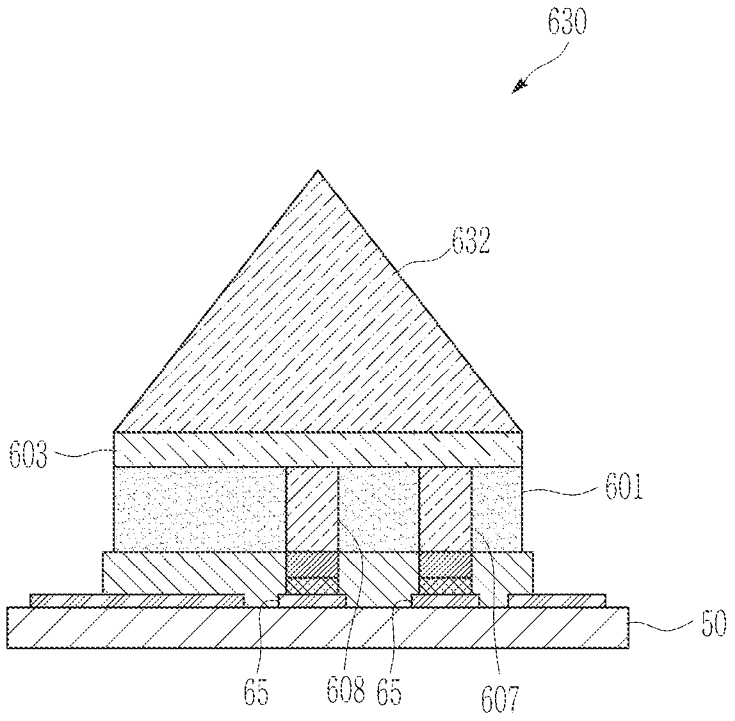

In the DRA module 630 illustrated in FIG. 36, the upper dielectric block 632 may have a shape of a quadrangular pyramid tapered upward.

Figure 37:
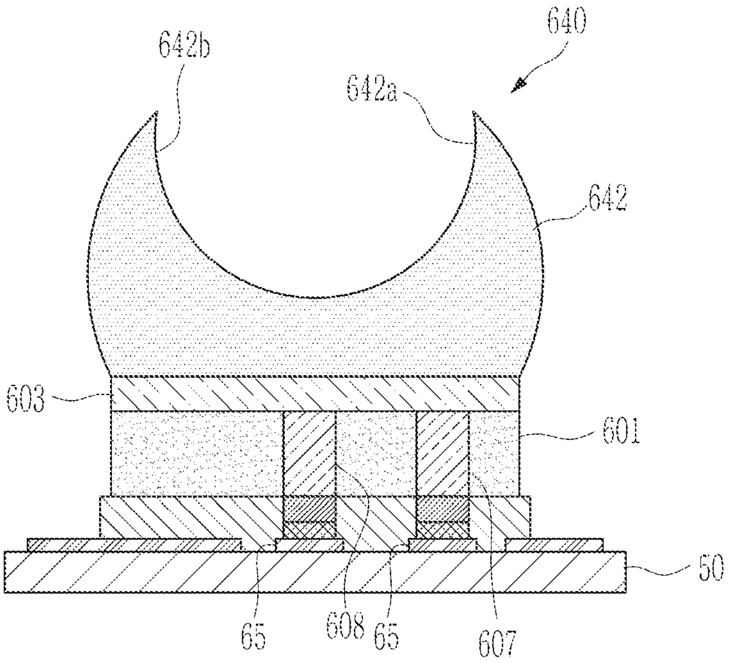

In the DRA module 640 illustrated in FIG. 37, the upper dielectric block 642 may have a shape having curved tip portions **642*a* and 642*b* at left and right sides of the upper dielectric block 642 and a curved concave portion at a center of the upper dielectric block 642**.

Figure 38:
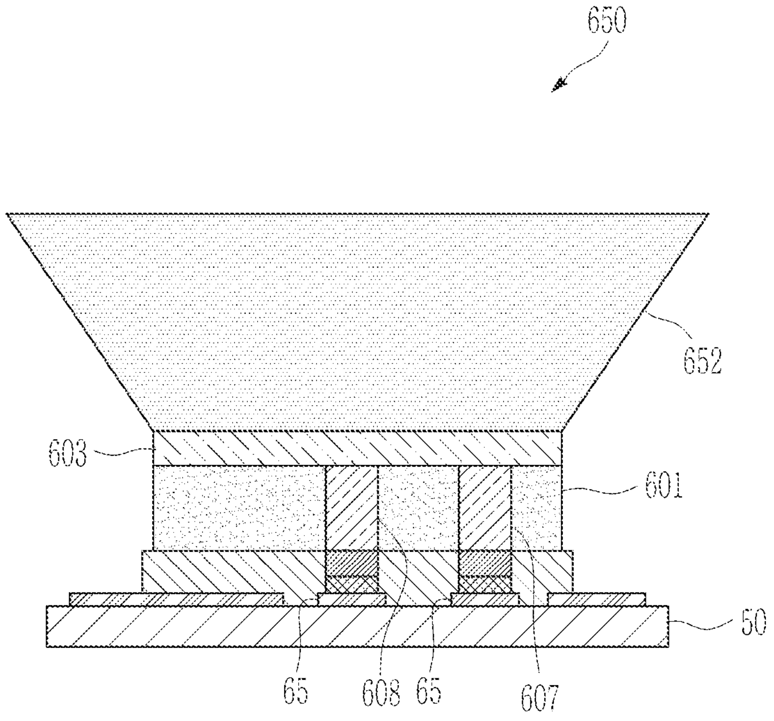

In the DRA module 650 illustrated in FIG. 38, the upper dielectric block 652 may have a shape of a square truncated cone including an upper side and lower side that is narrower than the upper side, by having a flat cross-sectional area that expands in an upward direction of the upper dielectric block 652.

Figure 39:
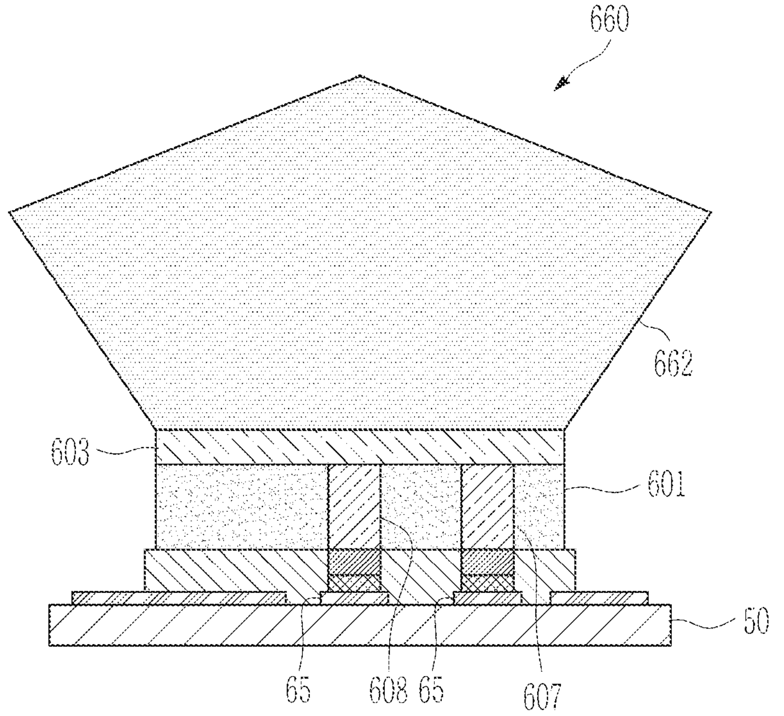

In the DRA module 660 illustrated in FIG. 39, the upper dielectric block 662 may have a polyhedral shape having a pentagonal longitudinal cross-section.

When applied to impedance matching in the shape of the upper dielectric blocks 612, 622, 632, 642, 652, and 662 in the embodiments shown in FIG. 34 to FIG. 39, a bandwidth and gain of the antenna may be improved, and straightness can be improved.

Figure 40:
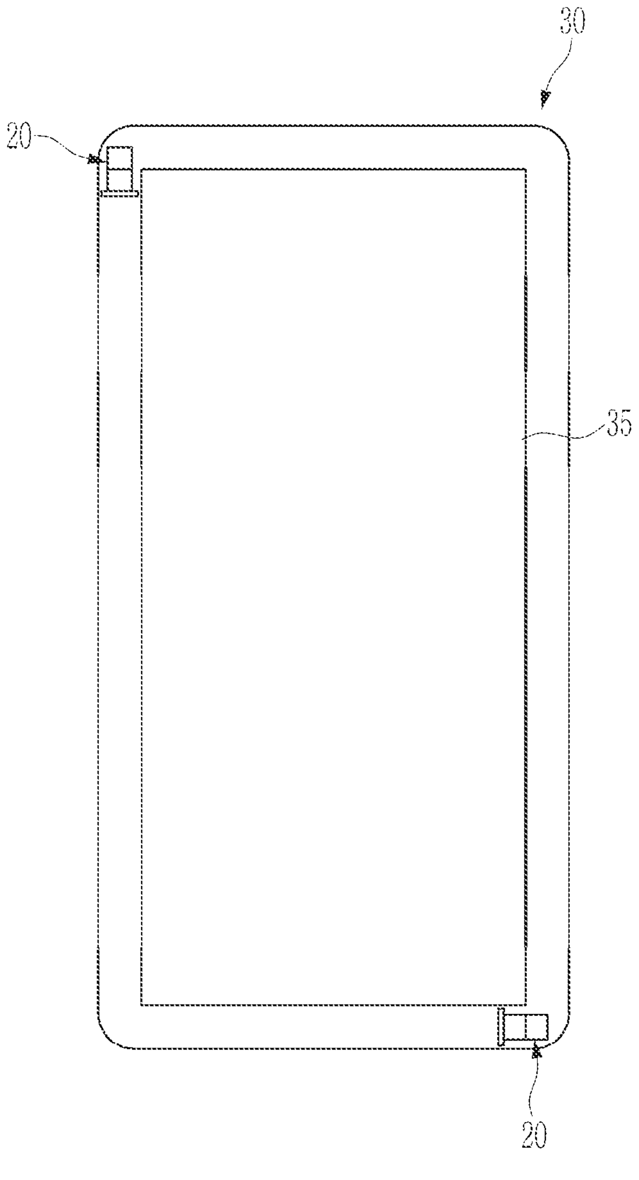
FIG. 40 is a schematic diagram of an electronic device including an antenna module, according to an embodiment.

FIG. 40 illustrates a schematic diagram of an electronic device 30 including a DRA module 20, according to an embodiment.

Referring to FIG. 40, the electronic device 30 a DRA module 20, and the DRA module 20 may be disposed on a set board 35 of the electronic device 30. The electronic device 30 may have polygonal sides, and the antenna module 20 may be disposed adjacent to at least some of the sides of the electronic device 30.

For example, the electronic device 30 may be a smart phone, a personal digital assistant, a digital video camera, a digital still camera, a network system, a computer, a monitor, a tablet, a laptop, a network, a television, a video game, a smart watch, an automotive device, or the like, but is not limited thereto.

The DRA module 20 may include a DRA in which a plurality of dielectric blocks are stacked in a single direction on a board through one or more polymer layers and a feed via is formed in a dielectric block that is adjacent to the board. That is, the DRA module 20 may correspond to any one of the DRA antenna modules described above.

As such, the DRA module 20 may have a structure that extends in a direction, and thus it is easy to arrange the DRA module 20 along an edge adjacent to an edge of the electronic device 30.

Examples of a dielectric resonator antenna (DRA) modules in which a plurality of layers of dielectric blocks are mounted on an upper surface of a board are illustrated and described herein, but a structure in which a cavity is formed in the board and at least one of the dielectric blocks is positioned in the cavity and is embedded in the board is also possible.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DESCRIPTION OF SYMBOLS

50: board
60: ground electrode
65: feed wire
90, 100: dielectric resonator antenna
91, 101, 201: first dielectric block
92, 102, 132, 142, 202: second dielectric block
93, 103, 153, 203, 209, 213, 219: polymer layer
107, 307: first feed via
108, 308: second feed via
107*a*, 108*a*: connection pad
110, 130, 140, 150, 160, 200, 220, 240: dielectric resonator antenna module
310, 320, 330, 340, 410, 420, 430, 440, 510, 520, 530, 550: dielectric resonator antenna module
610, 620, 630, 640, 650, 660: dielectric resonator antenna module
136: metal via
146: metal wall
156, 226: metal patch
167, 168: first, second patch
205, 245: first feed strip
206, 246: second feed strip
205*a*, 206*a*: connection pad

What is claimed is:

1. A dielectric resonator antenna comprising:

a first dielectric block made entirely of ceramic material;

at least one second dielectric block stacked on the first dielectric block in a first direction;

a polymer layer disposed between the first dielectric block and the at least one second dielectric block;

a feed unit disposed inside the first dielectric block or on an outer surface of the first dielectric block, the feed unit extending in the first direction; and a metal wall disposed only along a circumference of a second dielectric block among the at least one second dielectric block to cover an outer side surface of the second dielectric block, wherein a side surface of the first dielectric block facing a second direction crossing the first direction is exposed to an outside of the dielectric resonator antenna, and a dielectric constant of the polymer layer is lower than a dielectric constant of the first dielectric block and a dielectric constant of the at least one second dielectric block.

2. The dielectric resonator antenna of claim 1, wherein the first dielectric block and the second dielectric block adjacent to the first dielectric block among the at least one second dielectric block are aligned with each other such that at least one pair of side surfaces of the first dielectric block and the second dielectric block are disposed on a same plane.

3. The dielectric resonator antenna of claim 1, wherein the at least one second dielectric block has a same stacking plane shape as the first dielectric block to overlap the first dielectric block on a stacking plane.

4. The dielectric resonator antenna of claim 1, wherein a dielectric constant of the first dielectric block is different from a dielectric constant of the at least one second dielectric block.

5. The dielectric resonator antenna of claim 1, wherein the feed unit comprises a feed via extending in the first direction disposed inside the first dielectric block.

6. The dielectric resonator antenna of claim 5, wherein the feed via comprises a first feed via and a second feed via spaced apart from each other and disposed inside the first dielectric block.

7. The dielectric resonator antenna of claim 1, wherein the feed unit comprises a feed strip extending in the first direction on the outer surface of the first dielectric block.

8. The dielectric resonator antenna of claim 1, further comprising a metal via extending in the first direction disposed inside the second dielectric block among the at least one second dielectric block.

9. The dielectric resonator antenna of claim 1, further comprising a plurality of metal vias extending in the first direction disposed inside the second dielectric block among the at least one second electric dielectric block, wherein the plurality of metal vias are disposed along the circumference of the second dielectric block to form a via wall.

10. The dielectric resonator antenna of claim 1, further comprising a metal patch connected to the feed unit and disposed on an upper surface of the first dielectric block on which the at least one second dielectric block is stacked.

11. The dielectric resonator antenna of claim 1, wherein the at least one second dielectric block is stacked on the first dielectric block in only the first direction, and the first direction is one direction among two directions of an axis.

12. A dielectric resonator antenna module comprising:

a board;

a first dielectric block made entirely of ceramic material and disposed on the board;

at least one second dielectric block stacked on the first dielectric block in a first direction;

a polymer layer disposed between the first dielectric block and the at least one second dielectric block; and a feed unit disposed inside the first dielectric block or on an outer surface of the first dielectric block, the feed unit extending in the first direction; and a metal patch connected to the feed unit and disposed on an upper surface of the first dielectric block on which the at least one second dielectric block is stacked, wherein a side surface of the first dielectric block facing a second direction crossing the first direction is exposed to an outside of the dielectric resonator antenna module, wherein a dielectric constant of the polymer layer is lower than a dielectric constant of the first dielectric block and a dielectric constant of the at least one second dielectric block, and wherein the metal patch comprises a first metal patch and a second metal patch different from the first metal patch.

13. The dielectric resonator antenna module of claim 12, wherein the board comprises a stacking plane, and the first direction is a direction that is perpendicular to the stacking plane.

14. The dielectric resonator antenna module of claim 12, further comprising a feed wire disposed on the board, wherein the feed unit comprises a feed via extending in the first direction disposed inside the first dielectric block and connected to the feed wire.

15. The dielectric resonator antenna module of claim 12, wherein the at least one second dielectric block is stacked on the first dielectric block in only the first direction, and the first direction is one direction among two directions of an axis.

16. A dielectric resonator antenna comprising:

a first dielectric block made entirely of ceramic material;

a second dielectric block vertically stacked on the first dielectric block;

a polymer layer disposed between the first dielectric block and the second dielectric block; and a feed unit comprising feed vias extending vertically disposed inside the first dielectric block, wherein the side surface of the first dielectric block extends vertically and is exposed to an outside of the dielectric resonator antenna, and a dielectric constant of the polymer layer is lower than a dielectric constant of the first dielectric block and a dielectric constant of the second dielectric block, wherein metal vias extend vertically disposed inside the second dielectric block, and the feed vias are formed by portions of the metal vias.

17. The dielectric resonator antenna of claim 16, further comprising a third dielectric block vertically stacked on the first dielectric block and disposed between the first dielectric block and the second dielectric block.

18. The dielectric resonator antenna of claim 17, wherein no metal vias are disposed inside the third dielectric block.

19. The dielectric resonator antenna of claim 17, further comprising metal vias extending vertically disposed inside the third dielectric block.

* * * * *